(12) United States Patent
Kuribayashi

(10) Patent No.: US 7,519,299 B2
(45) Date of Patent: Apr. 14, 2009

(54) OPTICAL SIGNAL REGENERATIVE REPEATER, OPTICAL GATE CONTROL METHOD, AND OPTICAL SIGNAL REGENERATION METHOD

(75) Inventor: Ryosuke Kuribayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 610 days.

(21) Appl. No.: 10/773,339

(22) Filed: Feb. 9, 2004

(65) Prior Publication Data

US 2004/0170438 A1 Sep. 2, 2004

(30) Foreign Application Priority Data

Feb. 28, 2003 (JP) ............... 2003-054310

(51) Int. Cl.
*H04B 10/00* (2006.01)
*H04B 10/02* (2006.01)
(52) U.S. Cl. ................ 398/175; 398/154; 398/155; 398/158
(58) Field of Classification Search ........ 398/175, 398/146, 150, 154, 155, 158, 173, 178
See application file for complete search history.

(56) References Cited

U.S. PATENT DOCUMENTS

| 6,064,513 A * | 5/2000 | Wada ............. 359/337 |
| 6,963,436 B2 * | 11/2005 | Watanabe et al. ......... 359/239 |
| 2002/0080453 A1 * | 6/2002 | Leuthold et al. ........... 359/176 |

FOREIGN PATENT DOCUMENTS

| JP | 8-163047 A | 6/1996 |
| JP | 2001-249371 A | 9/2001 |
| JP | 2002-229081 A | 8/2002 |

OTHER PUBLICATIONS

40-Ghz Tunable Optical Pulse Generation from a Highly-Stable External Cavity Mode-locked Semiconductor Laser Module to Hashimoto et al., OFC Mar. 2002.*
H. Thiele et al., "Recirculating loop demonstration of 40 Gbit/s all-optical 3R data regeneration using a semiconductor nonlinear interferometer", Electronics Letters, vol. 35, No. 3, Feb. 4, 1999, pp. 230-231.

(Continued)

*Primary Examiner*—Dalzid Singh
(74) *Attorney, Agent, or Firm*—Sughrue Mion, PLLC

(57) ABSTRACT

An optical signal regenerative repeater is provided including at least one first optical 3R repeater based on an optical communication signal pulse, regenerating the optical communication signal pulse. The first optical 3R repeater comprises a first clock extraction unit extracting a clock from the optical communication signal pulse and generating a first optical clock pulse synchronized with the extracted clock. The first optical 3R repeater also comprises a first optical gate, which is opened and closed in accordance with a control light corresponding to the optical communication signal pulse, which receives as a controlled light the first optical clock pulse generated by the first clock extraction unit, and which generates a first regenerated signal pulse corresponding to said optical communication signal pulse. Further, a pulse time width of the control light and the controlled light is different.

20 Claims, 24 Drawing Sheets

OTHER PUBLICATIONS

H. Kurita et al., "All-Optical 3R Regeneration based on Optical Clock Recovery with Mode-Locked LDs", Proc. of ECOC 99, PD3-6, (1999).

K. Tajima, "All-Optical Switch with Switch-Off Time Unrestricted by Carrier Lifetime", Japan J. Appl. Phys. vol. 32, Part 2, No. 12A, Dec. 1, 1993, pp. L1746-L1749.

K. Tajima et al., "Utrafast polarization-discriminating Mach-Zehnder all-optical switch", Appl. Phys. Lett. 67, (25), Dec. 18, 1995, pp. 3709-3711.

M. Farries et al., "Optical fiber switch employing a Sagnac interferometer", Appl. Phys. Lett., (1), Jul. 3, 1989, pp. 25-26.

Y. Ueno et al., "3.8-THz Wavelength Conversion of Picosecond Pulses Using a Semiconductor Delayed-Interference Signal-Wavelength Converter (DISC)", IEEE Photonics Technology Letters, vol. 10, No. 3, Mar. 1998, pp. 346-348.

J. Leuthold et al., "Novel 3R Regenerator Based on Semiconductor Optical Amplifier Delayed-Interference Configuration", IEEE Photonics Technology Letters, vol. 13, No. 8, Aug. 2001, pp. 860-862.

H. Kurita et al., "Ultrafast All-Optical Signal Processing with Mode-Locked Semiconductor Lasers", IEICE Trans. Electron., vol. E81-C, No. 2, Feb 1998, pp. 129-139.

B. Lavigne et al., "Cascade of 100 optical 3R regenerators at 40Gbit/s Based on all-active Mach Zehnder interferometers", Proc. 27th Eur. Conf. on Opt. Comm. (ECOC 01-Amsterdam), pp. 290-291.

* cited by examiner

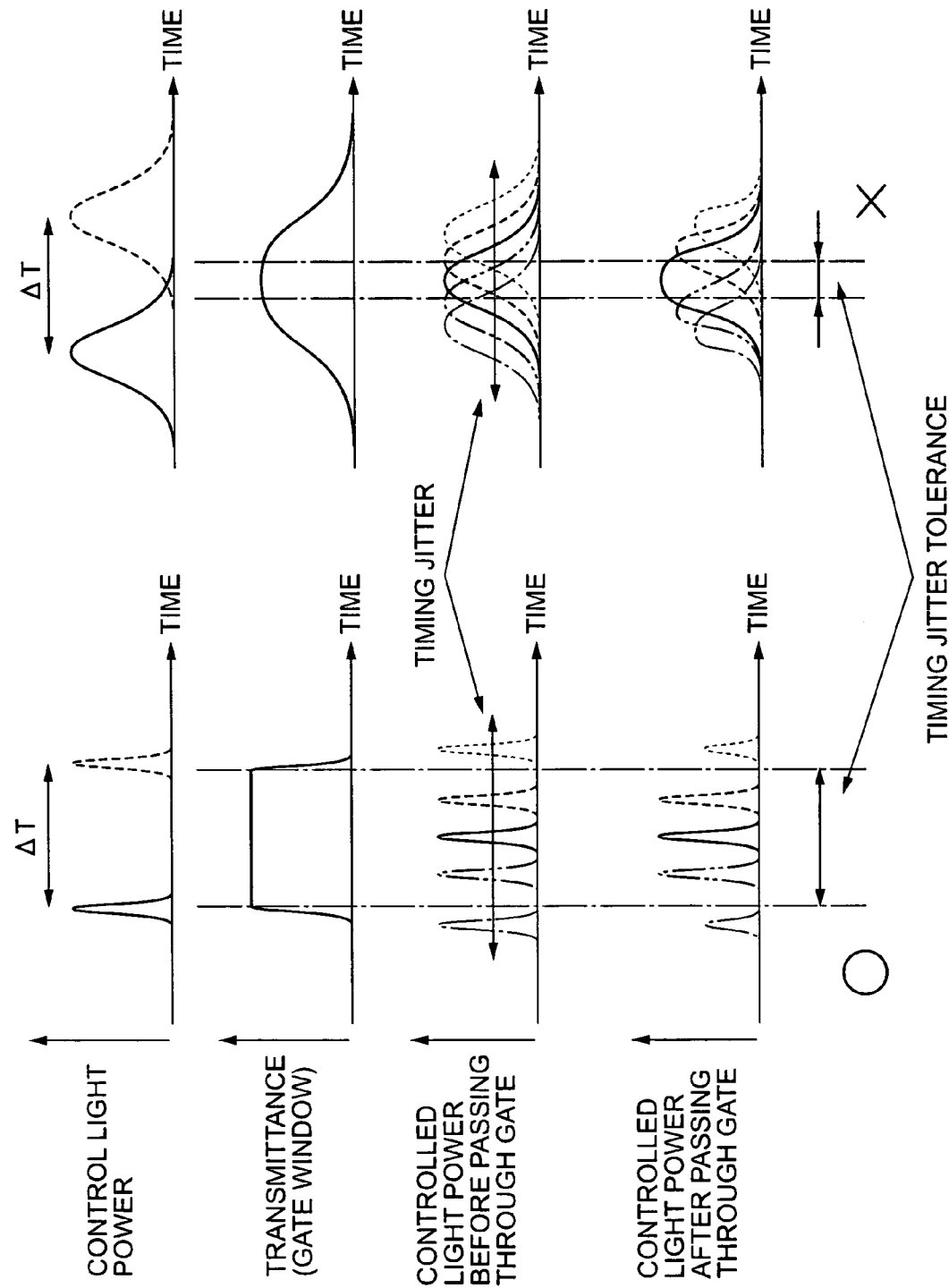

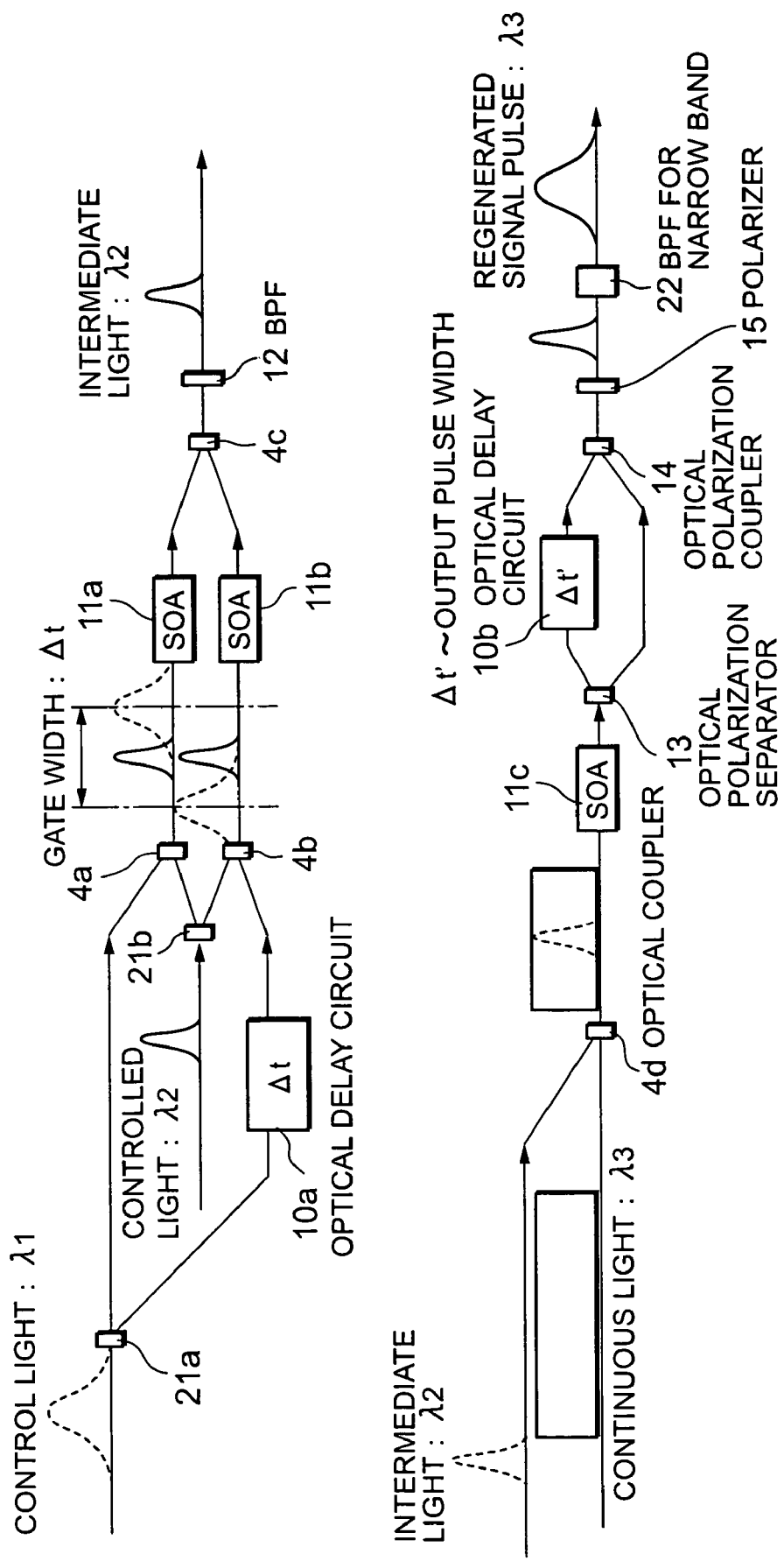

OPTICAL SIGNAL REGENERATIVE REPEATER, OPTICAL GATE CONTROL METHOD, AND OPTICAL SIGNAL REGENERATION METHOD

BACKGROUND OF THE INVENTION

1. Field of the Invention

The present invention relates to an optical repeater and an optical signal regeneration method, and in particular to an optical repeater used for optical digital communication, and an optical signal regenerative repeater for regenerating and transmitting a digital signal light.

2. Description of the Related Art

For optical digital communication, when an optical communication signal (digital signal light) is transmitted along a transmission path made of an optical fiber, deterioration of the signal occurs due to effects produced by various factors, such as wavelength dispersion, nonlinear optical effects and timing jitter. Therefore, an optical light regenerative repeater is ordinarily employed to provide pulse regeneration for a received, deteriorated optical communication signal, and to obtain and transmit a signal light corresponding to the light communication signal before being deteriorated.

One such optical signal regenerative repeater is an optical 3R repeater having 3R functions, i.e., the reamplification, reshaping and retiming functions. Upon the reception of a deteriorated signal, the reamplification function reamplifies the intensity and the reshaping function reshapes the distorted waveform; and the retiming function, using the signal light, regenerates a clock signal that enables the transmission, at a correct time interval, of the reamplified and reshaped waveform.

Japanese published application H8-163047A, H. J. Thiele et al., Electron. Lett. 35, 230 (1999), and H. Kurita et al., Proc. of ECOC '99, PD3-6 (1999) disclose a general configuration for the optical 3R repeater as shown in FIG. 1. This optical 3R repeater comprises an optical branching device 101, a clock extraction device 102, and an optical gate 103. The optical branching device 101 divides a deteriorated optical communication pulse having a deteriorated wavelength of λ 1 into two pulses. One of the optical communication signal pulses obtained by the optical branching device 101 is supplied as control light to the optical gate 103, while the other optical communication signal pulse is transmitted to the clock extraction device 102. The clock extraction device 102 extracts the clock for the optical communication signal pulse received from the optical branching device 101, and generates an optical clock pulse, having a wavelength of λ 2, that is synchronized with the extracted clock. The optical clock pulse generated by the clock extraction device 102 is then transmitted to the optical gate 103.

In the above described optical 3R repeater, the optical gate 103 is opened or closed in accordance with the deteriorated optical communication signal pulse (control light), while the optical clock pulse received from the clock extraction device 102 is passed to the optical gate 103, and communication data are transferred to the optical clock pulse. In this manner, the discrimination and the regeneration of the deteriorated data are performed.

Recently, as a result of the rapid development of the Internet, a demand for the expansion of the optical communication capacity has been increased, and a fast optical gate operating at a transfer rate (bit rate) of 40 Gb/s or higher has been requested. Such a fast optical gate is available as a push-pull optical gate that uses light interference. By employing the configuration of this typical optical gate, the principles of the operation is described next.

K. Tajima, Japan J. Appl. Phys. 32, L1746 (1993) discloses an example of a push-pull optical gate in the form of a symmetrical Mach-Zehnder (SMZ) optical gate, as shown in FIG. 2. According to the SMZ optical gate, a control optical pulse (λ 1) is divided, by an optical branching device 201a, into first and second control optical pulses, and a controlled optical pulse (λ 2) is divided, by an optical branching device 201b, into first and second controlled optical pulses.

The first control optical pulse is transmitted directly to an optical coupler 204a and is coupled with the first controlled optical pulse. During this coupling process, the first control optical pulse is inserted, along the time axis, into a position preceding the first controlled optical pulse, and the second control optical pulse is delayed by an optical delay circuit 210 for a delay time Δ t, and is transmitted to an optical coupler 204b where it is coupled with the second controlled optical pulse. For this coupling process, the second control optical pulse is inserted, along the time axis, into a position following the second controlled optical pulse.

The first control optical pulse and the first controlled optical pulse arrive at a nonlinear optical phase shifter 211a in the this order, and the second controlled optical pulse and the second control optical pulse arrive at a nonlinear optical phase shifter 211b in this order. Furthermore, the timing at which the first and second controlled optical pulses arrive at the nonlinear optical phase shifters are the same, while the timing the first control optical pulse arrive at the nonlinear optical phase shifter is earlier than the timing of the controlled optical pulses, and the timing the second control optical pulse arrives at the nonlinear optical phase shifter is later than the timing the controlled optical pulses. Therefore, under these circumstances, the first and the second controlled optical pulses are sandwiched between the first and the second control optical pulses. At this time, the time interval between the first and the second control optical pulses is Δ t, and is employed as the gate width for the SMZ optical gate.

When the control optical pulses enter the nonlinear optical phase shifters 211a and 211b, a nonlinear phase shift occurs in the controlled optical pulses that arrive thereafter. Thus, in the nonlinear optical phase shifter 211a, the nonlinear phase shift occurs in the first controlled optical pulse due to the first control optical pulse, whereas in the nonlinear optical phase shifter 211b, a nonlinear phase shift does not occur because the second controlled optical pulse arrives before the second control optical pulse.

The first and the second controlled optical pulses, once they have passed through the nonlinear optical phase shifters 211a and 211b, arrive at the optical coupler 204c. Because of interference, the optical coupler 204c outputs an optical pulse only when there is a phase difference between the received controlled optical pulses. When there is no phase difference, the optical coupler 204c does not output an optical pulse because the controlled optical pulses cancel out each other. Since, in case there is the control optical pulse, there is a phase difference between the first and the second controlled optical pulses, the optical coupler 204c outputs an optical pulse (λ 2) obtained by synthesizing the controlled optical pulses. The optical pulse output by the optical coupler 204c passes through a wavelength band-pass filter (BPF) 212 and is output as gate passing light to the outside through the SMZ optical gate.

Generally, in the optical 3R repeater, the clock extraction device outputs controlled optical pulses at constant intervals. At the above described SMZ optical gate, as is shown in FIG.

3, of the controlled optical pulses that are sequentially input at constant intervals, the only controlled optical pulse sandwiched between the first control optical pulse (switch-ON) and the second control optical pulse (switch-OFF) is extracted.

K. Tajima et al., Appl. Phys. Lett. 67, 3709 (1995) discloses a polarization discriminating SMZ optical gate (PD-SMZ or UNI (Ultrafast Nonlinear Interferometer)) as shown in FIG. 4. At the polarization discriminating (PD-) SMZ optical gate, an optical polarization separator 213a divides a controlled optical pulse (λ 2) to obtain controlled optical pulses having first and second polarized components (TE mode and TM mode). The controlled optical pulse (TE; λ 2) is transmitted directly to an optical polarization coupler 214a, where it is coupled with the controlled optical pulse (TM; λ 2). The controlled optical pulse (TM; λ 2) is delayed by an optical delay circuit 210a for a delay time Δ t. The interval for the resultant controlled optical pulse (TE/TM; λ 2) is Δ t, and is employed as the gate width for the PD-SMZ optical gate.

The controlled optical pulse (TE/TM; λ 2), which is obtained by optical polarization coupler 214a, is transmitted to an optical coupler 214b and is coupled with a control optical pulse (λ 1), and thereafter, the thus obtained control optical pulse (λ 1) and the controlled optical pulse (TE/TM; λ 2) are received by a nonlinear phase shifter 211. The nonlinear phase shifter 211 receives the controlled optical pulse (TE), the control optical pulse and the controlled optical pulse (TM) in the named order. Therefore, at the nonlinear phase shifter 211, a nonlinear phase shift occurs only for the controlled optical pulse (TM), which arrives after the control optical pulse.

The controlled optical pulse (TE/TM), which passes through the nonlinear phase shifter 211, is again divided by an optical polarization separator 213b, and the controlled optical pulse (TM) is transmitted directly to an optical polarization coupler 214c, where it is coupled with the controlled optical pulse (TE). The controlled optical pulse (TE) is delayed by an optical delay circuit 210b for a delay time Δ t. Interference and synthesization is then performed for the resultant controlled optical pulse (TE/TM), and thereafter, an arbitrary linearly-polarized component is selected by a polarizer 215. Subsequently, the pulse of the selected linearly-polarized component passes through a wavelength band-pass filter (BPF) 212, and is output as gate passing light to the outside through the PD-SMZ optical gate.

At the PD-SMZ optical gate, the wavelength band-pass filter 212 may be positioned immediately after either the nonlinear phase shifter 211 or the optical coupler 214c. Further, in the above description, no problem is encountered when the TE mode and the TM mode are exchanged.

M. C. Farries et al., Appl. Phys. Lett. 55, 25 (1995) discloses another push-pull optical gate which is a nonlinear optical loop mirror shown in FIG. 5 (NOLM, SLALOM (Semiconductor Laser Amplifier in a Loop Mirror) or TOAD (Terahertz Optical Asymmetric Demultiplexer)). This nonlinear optical loop mirror has a loop structure, and a nonlinear optical phase shifter 211 is provided as a part of a fiber loop. A controlled optical pulse (λ 2), is provided into the fiber loop by an optical coupler 216 located opposite the nonlinear optical phase shifter 211 along the fiber loop, and at this time, the controlled optical pulse is divided into a first controlled optical pulse which is transmitted clockwise along the fiber loop, and a second controlled optical pulse which is transmitted counterclockwise.

The first controlled optical pulse arrives at the nonlinear optical phase shifter 211 directly, whereas before the second controlled optical pulse arrives at the nonlinear optical phase shifter 211, it is delayed by an optical delay circuit 210 for a delay time Δ t. Therefore, between the timings whereat the first and the second controlled optical pulses arrive at the nonlinear optical phase shifter 211 there is a time difference Δ t, and this difference is employed as a gate width.

An optical coupler 214 is provided along one transmission path connecting the optical coupler 216 and the nonlinear optical phase shifter 211, and a control optical pulse (λ 1) is introduced into the loop by the optical coupler 214. The control optical pulse is inserted, along the time axis, into a position after the first controlled light pulse, and the first controlled optical pulse, the control optical pulse and the second controlled optical pulse arrive at the nonlinear optical phase shifter 211 in the named order. Therefore, in the nonlinear phase shifter 211, a nonlinear phase shift occurs only for the second controlled optical pulse that arrives after the control optical pulse.

The second controlled optical pulse, which passes through the nonlinear phase shifter 211, arrives at the optical coupler 216, whereas the first controlled optical pulse, which also passes through the nonlinear phase shifter 211, is delayed by the optical delay circuit 210 for a delay time Δ t before it arrives at the optical coupler 216. Thus, the timings at which the first and the second controlled optical pulses arrive at the optical coupler 216 is the same, and the pulses interfere with each other. At this time, since there is a phase difference between the first and the second controlled optical pulses, an optical pulse (λ 2), obtained by synthesizing these controlled optical pulses, is extracted by the optical coupler 216 outside the loop. The thus extracted optical pulse then passes through the wavelength band-pass filter (BPF) 212, and is output as gate passing light to the outside the nonlinear optical loop mirror.

All of the fast optical gates described above are of a type whereby, due to the control optical pulse, a nonlinear phase shift occurs for the following controlled optical pulse, and a change in the interference state at the output port is employed to open or close the gate at high speed.

In addition to the above described optical 3R repeater, "IEEE Photonics Technology Letters", Vol. 10, pp. 346-348, 1998 proposed by Y. Ueno et al. discloses a DISC (Delayed-Interference Signal-wavelength Converter), which is also included as an optical signal regenerative repeater. According to the DISC, based on input signal light pulses, a phase shift intermittently occurs along the time axis for continuous light having a wavelength differing from that of the input signal light pulses. Thereafter, the continuous light interferes with its replica by shifting the time, so that signal light pulses having a converted wavelength is obtained. Excluding the retiming function, this converter serves as an optical 2R repeater.

Furthermore, "IEEE Photonics Technology Letters", Vol. 13, pp. 860-862, 2001 by J. Leuthold, et al., discloses a DISC that also serves as an optical 3R repeater by employing clock light pulses instead of continuous light, and by equaling to a bit period the time length that is to be shifted at the interference with the replicas.

Further, Japanese Published application 2002-229081A discloses an optical gate having a two-step structure, so that a sufficient intensity-noise suppression function can be performed for an optical signal, even when a phase shift obtained by the nonlinear phase shifter does not reach π.

In addition, Japanese Published application 2001-249371A discloses an optical gate having a two-step structure whereby the degree of freedom for wavelength conversion and the reliability for clock recovery are improved.

Depending on an increase of communication traffic, the transmission system can be changed from the WDM (Wavelength Division Multiplexing) system to the DWDM (Dense WDM) system, which divides a wavelength band into many more channels. In order to maximize a spectral efficiency in the DWDM system, the pulse time width of the optical communication signal pulse may be required to extend to about half that of the bit period, while it is maintained at the Fourier-transform limit.

The Japanese Published applications 2002-229081A and 2001-249371A mentioned above disclose a optical gate having a two-step configuration. However, there is no explanation for problems that arise when both a control light and a controlled light having a large pulse time width are employed in a DWDM system, such as problems associated with the shape along the time axis of the gate window, the timing jitter tolerance and the distortion of the regenerated output waveform.

SUMMARY OF THE INVENTION

An object of an embodiment of present invention is to provide an optical signal regenerative repeater, an optical gate control method and an optical signal regeneration method for an optical communication signal pulse having a large pulse time width.

Another object of an embodiment of the present invention is to provide an optical signal regenerative repeater and an optical signal regeneration method that output arbitrary wavelengths, including substantially the same input and output wavelengths.

According to an embodiment of the present invention, an optical signal regenerative repeater comprises at least one first optical 3R repeater which receives an optical communication signal pulse, which regenerates the optical communication signal pulse. The first optical 3R repeater comprises a first clock extraction unit which extracts a clock from the optical communication signal pulse and generates a first optical clock pulse synchronized with the extracted clock, and a first optical gate, which is opened and closed in accordance with a control light corresponding to the optical communication signal pulse, which receives as a controlled light the first optical clock pulse generated by the first clock extraction unit, and which generates a first regenerated signal pulse corresponding to said optical communication signal pulse, wherein a pulse time width of the control light and the controlled light is different.

According to another embodiment of the present invention, an optical gate control method comprises supplying to a nonlinear optical phase shifter controlled light having a first pulse time width; and supplying to the nonlinear optical phase shifter control light having a second pulse time width to generate a nonlinear optical phase shift in a pulse of the controlled light, wherein the first pulse time width and the second pulse time widths are different.

DESCRIPTION OF THE DRAWINGS

FIG. 8(a) is a diagram showing a timing jitter tolerance when the gate time window shape is a rectangle, and (b) is a diagram showing a timing jitter tolerance when the gate time window shape is a domed shape.

FIG. 24 is a block diagram showing a configuration according to a sixth example of the present invention.

DETAILED DESCRIPTION OF THE INVENTION

Figure 6A:
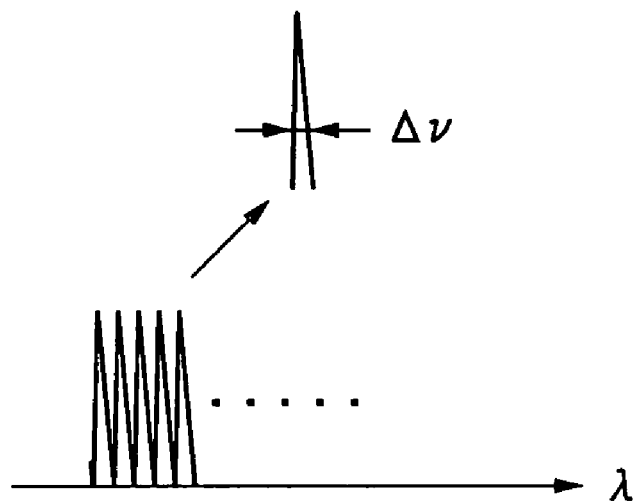
FIG. 6(a) is a diagram showing a divided optical spectrum (band) according to the DWDM system, and (b) is a diagram showing an optical communication signal pulse.
Figure 6B:
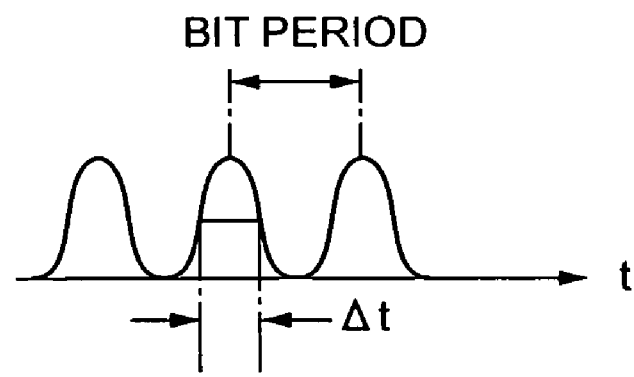

In order to maximize a spectral efficiency in the DWDM system, the pulse time width of the optical communication signal pulse may be required to extend to about half that of the bit period, while it is maintained at the Fourier-transform limit. A divided optical spectrum (band) is shown in FIG. 6(a), and an optical communication signal pulse is shown in FIG. 6(b). Since, in principle, the product of the pulse time width $\Delta t$ for the optical communication signal pulse and the optical spectral (band) width Δ ν is equal to or greater than a fixed value, the following expression is generally established.

$$\Delta t \Delta \nu \geq \alpha \qquad \text{EQUATION (1)}$$

Here, α depends on the temporal shape of the pulse. When the product Δ tΔ ν of the time and the band width is the minimum value α, the optical communication signal pulse is defined as being at the Fourier transform limit. According to the DWDM system, whereby high-capacity transmissions are performed by packing as many channels (wavelengths) as possible into a limited wavelength band, the most effective method for increasing the capacity, the pulse time width Δ t is extended to about half the bit period wherein crosstalk does not occur between adjacent bits for the same channel (wavelength), and is set to the transform limit whereat the optical spectral (band) width Δ ν is minimized. For example, since the bit period is 25 ps when the bit rate is 40 Gb/s, it is preferable that the pulse time width Δ t be about 12.5 ps.

Figure 1:
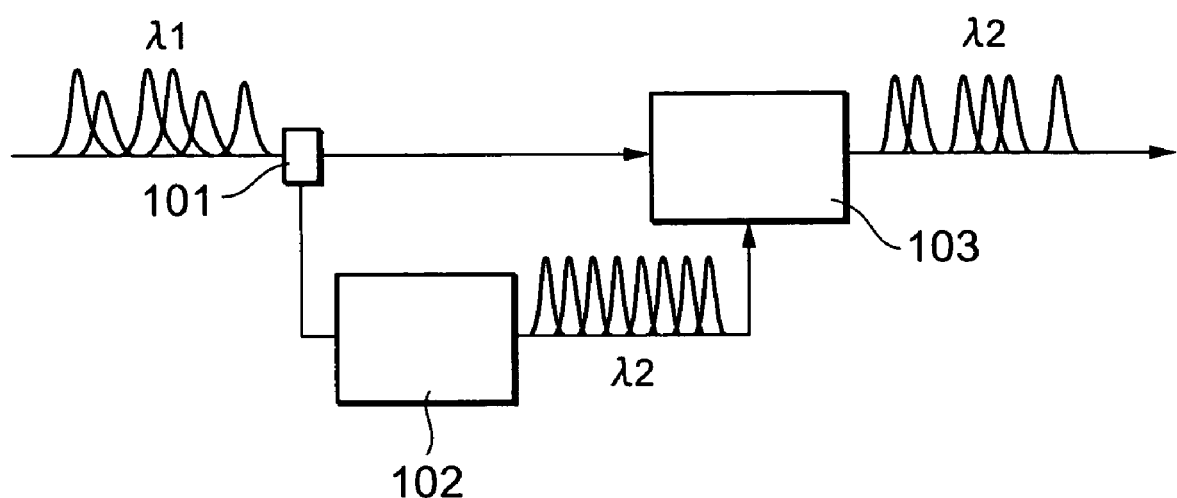
FIG. 1 is a block diagram showing the basic configuration of a conventional optical 3R repeater.
Figure 2:
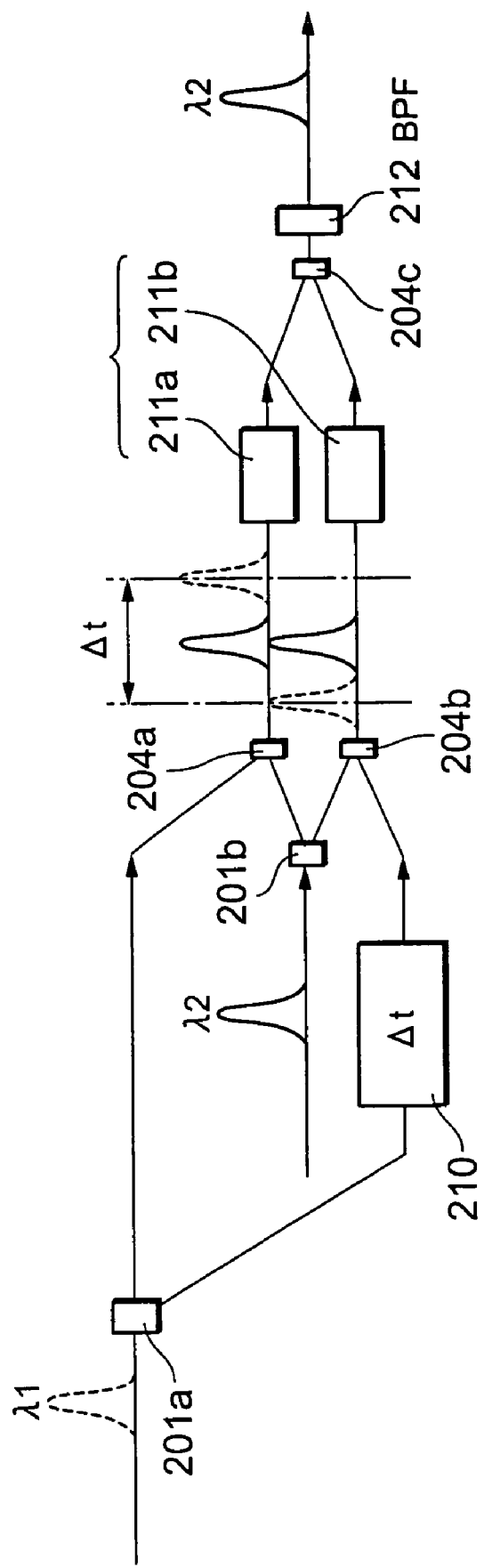
FIG. 2 is a block diagram showing the general configuration of a symmetrical Mach-Zehnder (SMZ) optical gate.
Figure 3:
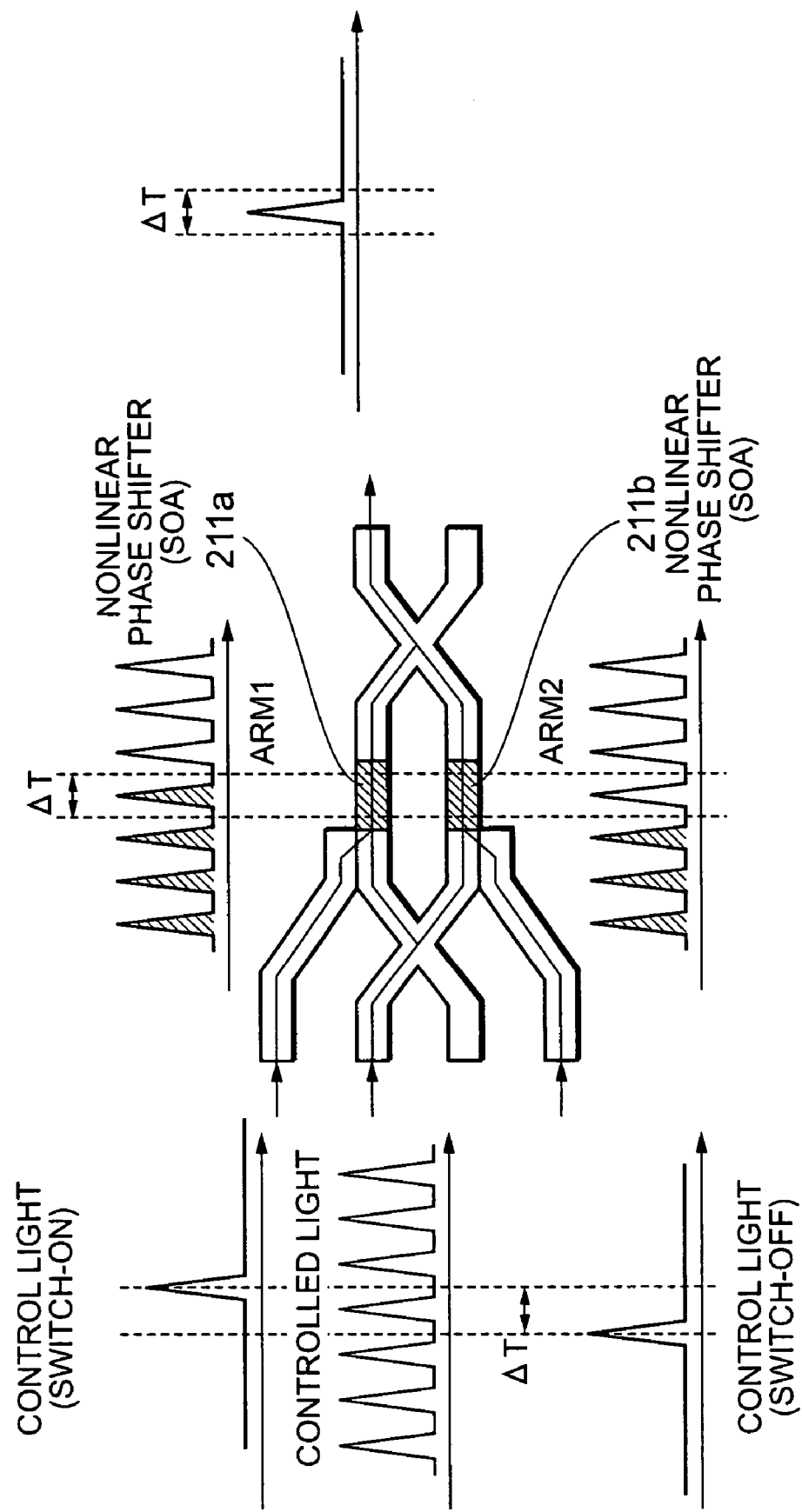
FIG. 3 is a diagram for explaining the operation of an SMZ optical gate.
Figure 4:
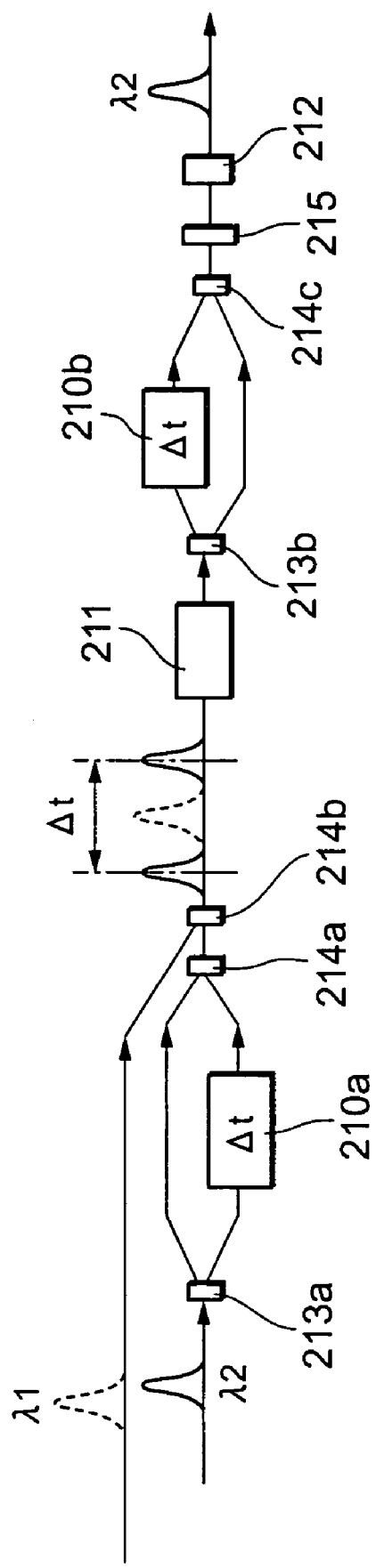
FIG. 4 is a block diagram showing the general configuration of a polarization discriminating symmetrical Mach-Zehnder optical gate.
Figure 5:
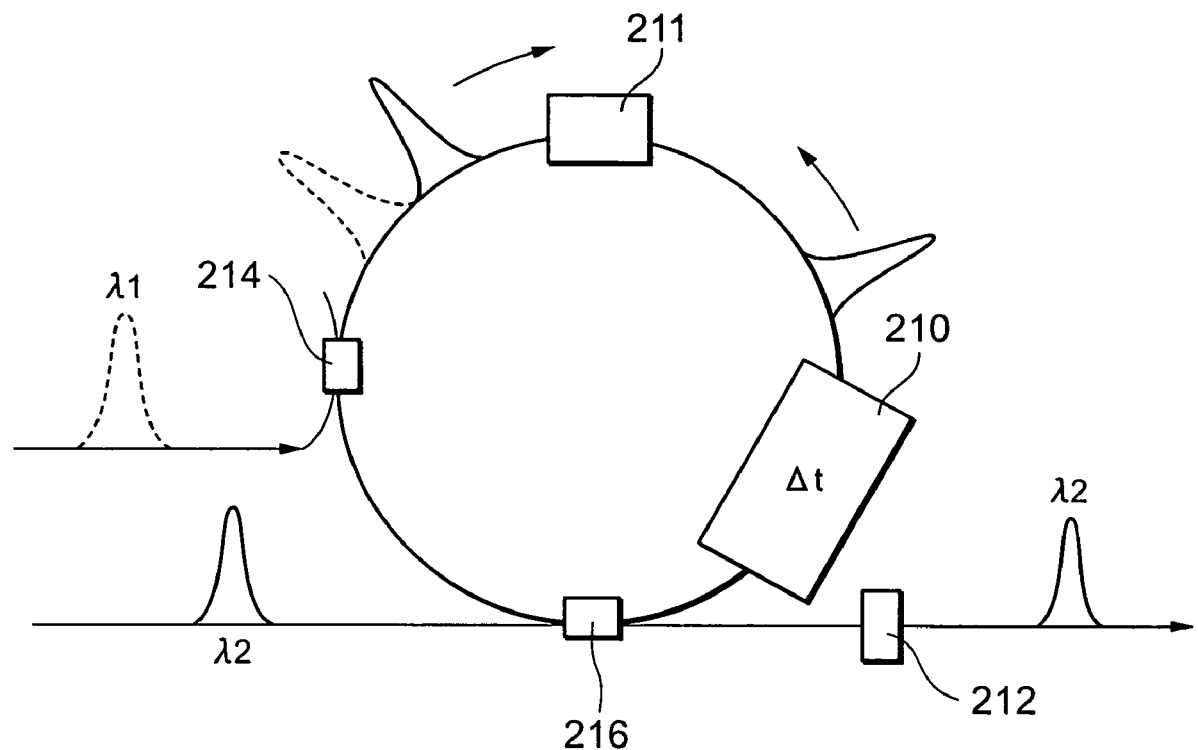
FIG. 5 is a block diagram showing the general configuration of a nonlinear optical loop mirror (NOLM) optical gate.

As is apparent from the above description, in order to perform transmissions in a higher capacity volume using the DWDM system, the pulse time width of the optical communication signal pulse must be extended to about half that of the bit period, while it is maintained at the transform limit. However, when the pulse width time for the optical communication signal pulse is increased, a new, subsequent problem, which is unknown conventionally, arises when the optical 3R repeater shown in FIG. 1 is employed as an optical signal regenerative repeater.

At the optical signal regenerative repeater, the received optical communication signal pulse is supplied as control light directly to the optical gate, and controlled light is generated, so that it can be synchronized with a clock extracted from the optical communication signal pulse, and is transmitted to the optical gate. In accordance with the control light, the optical gate is opened or closed, and a required pulse is extracted from the controlled light to regenerate the optical communication signal pulse. As is described above, when the pulse time width of the optical communication signal pulse is increased to perform a high capacity transmissions, the pulse time widths of both the control light and the controlled light that are supplied to the optical gate are extended to about half the bit period. When the control light and the controlled light have such wide pulse widths, a satisfactory tolerance (timing jitter tolerance) can not be obtained for the timings of the control light and the controlled light, and waveform distortion and intensity fluctuation of the output pulse occur.

Figure 7A:
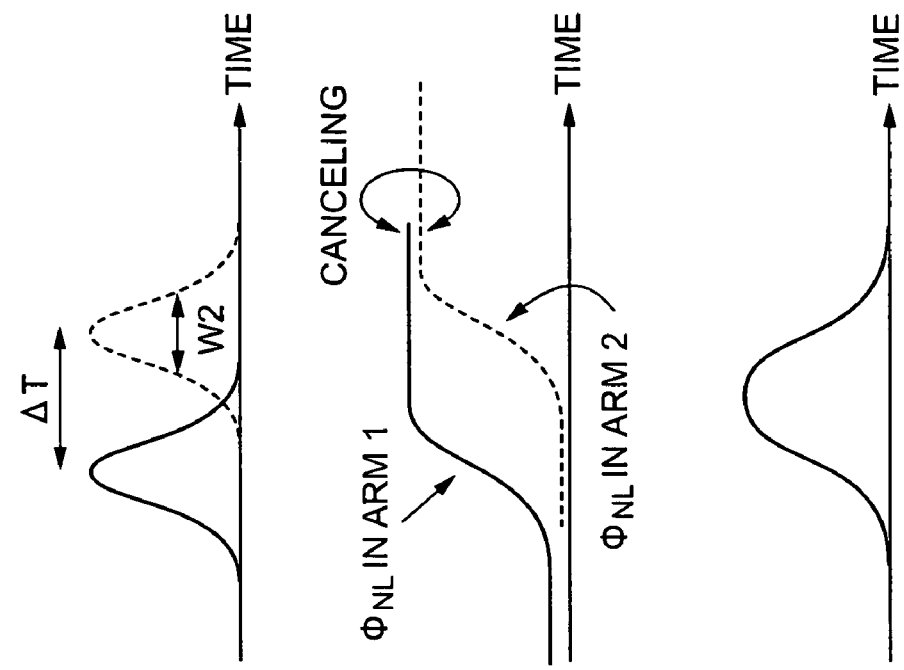
FIGS. 7(a) and (b) are diagrams for explaining a gate time window shape.
Figure 7B:
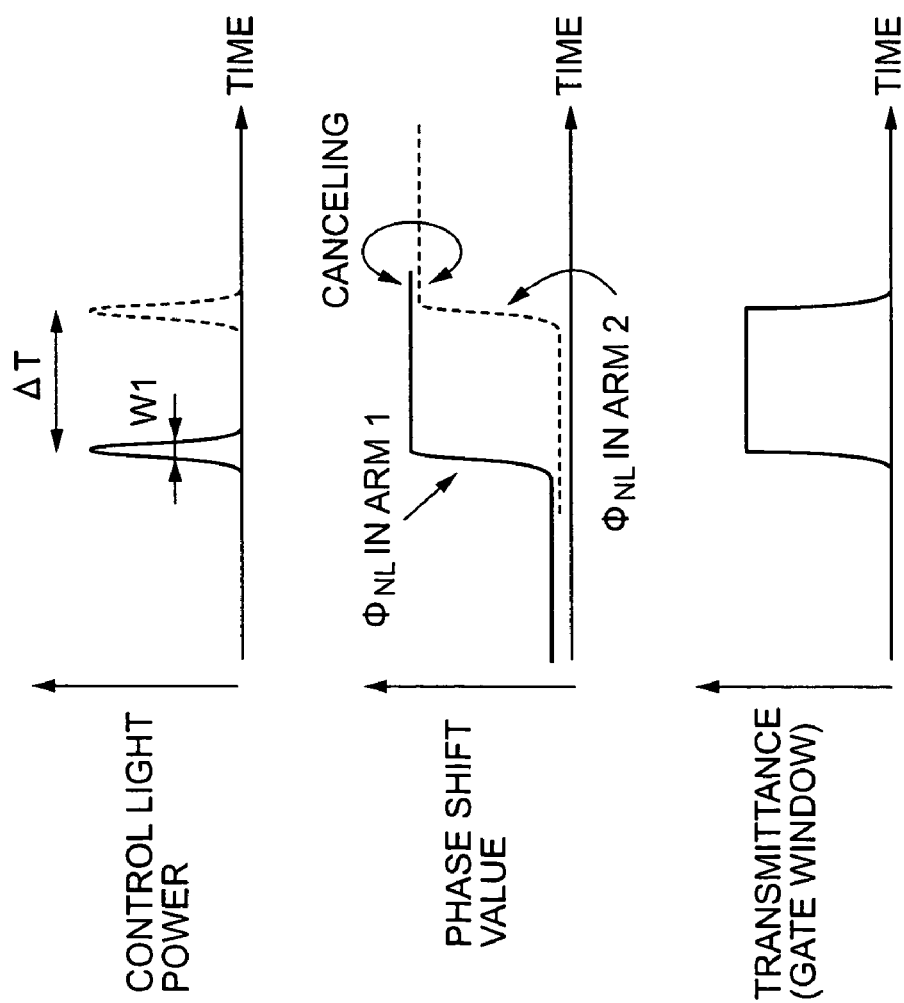

The timing jitter tolerance is determined in accordance with the relationship between the shape of the gate time window and the pulse shape of the controlled light. The gate time window shape is represented by a change in the gate transmittance when, the gate is opened. This shape is determined in accordance with the pulse shape of the control light. FIGS. 7(a) and 7(b) show the gate time window shapes when the gate width is Δ T and the pulse time widths of the control lights are W1 and W2 (W1<W2). When the pulse time width of the control light is small, as is shown in FIG. 7(a), the phase shift rises abruptly, so that the gate time window shape resembles a large rectangle for which the flat top portion is rather large. On the other hand, when the pulse time width W of the control light is large, as is shown in FIG. 7(b), the phase shift rises gradually, so that the gate time window shape resembles a dome for which the top flat portion is small.

When the pulse time widths of both the control light and the controlled light are small, as is shown in FIG. 7(a), and the gate time window shape is a rectangle for which the top flat portion is considerably large, since the peak of the pulse of the controlled light is also considerably narrow, as is shown in FIG. 8(a), a value equivalent to the gate width Δ T can be obtained as the timing jitter tolerance. Therefore, in this case, distortion of the waveform and fluctuation in the intensity do not occur in the output light of the optical gate. When the pulse time widths of both the control light and the controlled light are large and the gate time window shape resembles a dome for which the top flat portion is small, as is shown in FIG. 7(b), since the peak of the controlled light is also wide, as is also shown in FIG. 8(b), the timing jitter tolerance has a width (nearly the size of the top flat portion of the gate time window) that is considerably smaller than the gate width Δ T. Therefore, in this case, distortion of the waveform and fluctuation in the intensity occur in the output light of the optical gate.

Since the optical 3R repeater employing the interference type optical gate does not use a pulse that is consonant with the DWDM system and that has a time width that is about half the bit period, no problems occur related to the timing jitter tolerance, the distortion of the waveform and the fluctuation in the intensity. However, to perform high capacity transmissions using DWDM, these problems arise.

In addition to these problems, since the optical 3R repeater employs a high extinction ratio to separate control light and controlled light after the gate is operated, generally, different wavelengths are set for the control light and the controlled light. When this setup is employed for the conventional configuration wherein one clock extraction device and one optical gate are mounted, the wavelength differs at the input and output of the optical 3R repeater.

FIRST EMBODIMENT

Figure 9:
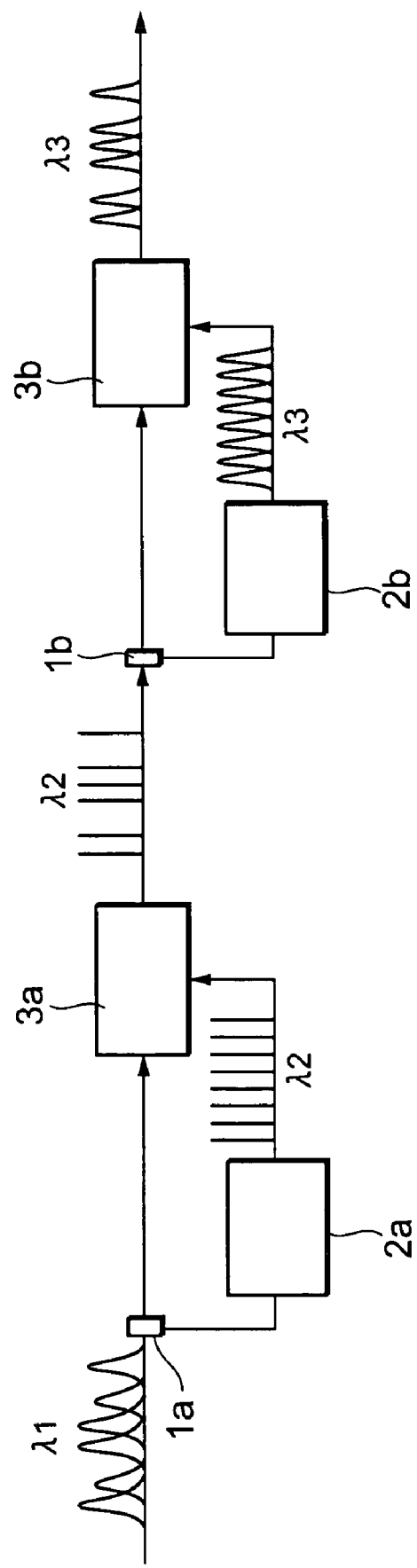
FIG. 9 is a schematic block diagram showing the configuration of an optical signal regenerative repeater according to a first embodiment of the present invention.

FIG. 9 shows a schematic configuration of an optical signal regenerative repeater according to a first embodiment of the present invention. This optical signal regenerative repeater comprises a series connection between a first optical 3R repeater and a second optical 3R repeater. The first optical 3R repeater includes an optical branching device 1a, a clock extraction unit 2a and an optical gate 3a, the second optical 3R repeater includes an optical branching device 1b, a clock extraction unit 2b and an optical gate 3b. The processes using the above described 3R functions are sequentially performed twice for a deteriorated optical communication signal pulse (wavelength λ 1) having a large pulse time width. The optical gates 3a and 3b are fast optical gates, such as the above described push-pull optical gates (e.g., SMZ optical gates, polarization discriminating SMZ optical gates, or nonlinear optical loop mirrors).

In the first optical 3R repeater, an input optical communication signal pulse is divided by the optical branching device 1a into two, and one of the obtained optical communication signal pulses is supplied to the optical gate 3a as control light for opening or closing the gate, while the other optical communication signal pulse is supplied to the clock extraction unit 2a. The clock extraction unit 2a extracts the clock for the optical communication signal pulse received from the branching device 1a, and generates a optical clock pulse (wavelength λ 2) that is synchronized with the extracted clock and has a considerably small pulse time width. The optical clock pulse generated by the clock extraction unit 2a is transmitted as controlled light to the optical gate 3a.

In accordance with the optical communication signal received though the optical branching device 1a, the optical gate 3a is opened or closed to transfer communication data to the optical clock pulse received from the clock extraction unit 2a. The optical clock pulse having a considerably small pulse time width, to which the communication data are transferred, is supplied as intermediate signal light to the second optical 3R repeater.

In the second optical 3R repeater, the intermediate light (wavelength λ 2) transmitted by the optical gate 3a is divided into two, by the optical branching device 1b, and one intermediate signal light obtained by branching is transmitted to the optical gate 3b as control light for opening and closing the optical gate 3b, while the other intermediate signal light is transmitted to the clock extraction unit 2b. The clock extraction unit 2b extracts the clock for the intermediate signal light received from the branching device 1b, and generates a optical clock pulse (wavelength λ 3) that is synchronized with the extracted clock and has a large pulse time width, so as to be consonant with the DWDM. The optical clock pulse generated by the clock extraction unit 2b is supplied as controlled light to the optical gate 3b.

In accordance with the intermediate signal light received from the optical branching device 1b, the optical gate 3b is opened or closed to transfer communication data to the optical clock pulse received from the clock extraction unit 2b. Thereafter, the optical clock pulse having a considerably large pulse time width, to which the communication data are transferred, is output as a regenerated, optical communication signal pulse by the optical signal regenerative repeater.

According to the above described optical signal regenerative repeater in this embodiment, in the first optical 3R repeater, the optical communication signal pulse having a large pulse time width is supplied as control light to the optical gate 3a, and the optical clock pulse having a small pulse time width is supplied as controlled light to the optical gate 3a. In this case, the optical gate 3a is operated in a state wherein the controlled light having a small pulse time width is sandwiched between the control lights having large pulse time widths, so that a enough large timing jitter tolerance can be obtained.

According to this embodiment, since the pulse time width of the control light or of the controlled light is smaller than the pulse time width of the other, the width of the timing jitter tolerance can be increased. For example, when the pulse time width of the control light is smaller, the gate time window shape is similar to a rectangle for which the top flat portion is large to a degree, and the high timing jitter tolerance can be obtained even when the pulse time width of the controlled light is large. When the pulse time width of the controlled light is smaller, the gate time window is shaped for which the top flat portion is small because the pulse time width of the control light is large, however, since the width at the peak of the controlled light is sufficiently small, the high timing jitter tolerance can be obtained.

Figure 10:
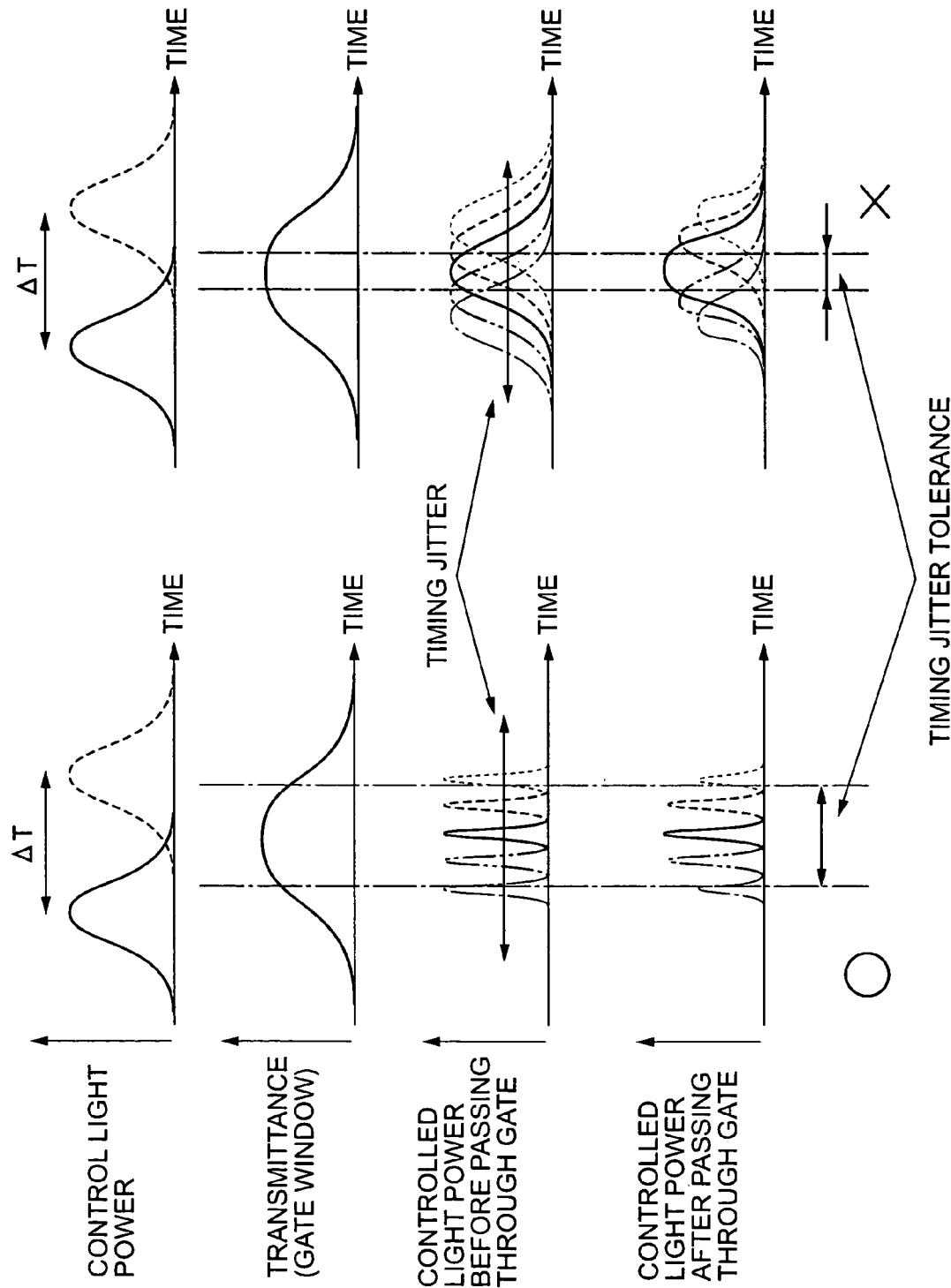
FIG. 10(a) is a diagram of a timing jitter tolerance of a first optical 3R repeater of the first embodiment of the present invention, and (b) is a diagram of a timing jitter tolerance of a comparison example.

The timing jitter tolerance for the first optical 3R repeater is shown in FIG. 10(a), and as a comparison example, the timing jitter tolerance when the pulse time widths of both the control light and the controlled light are large is shown in FIG. 10(b). For both the first optical 3R repeater and the comparison example, the gate window along the time axis is shaped like a dome having a small top flat portion.

In the comparison example, since the shape of the gate window along the time axis has a small top flat portion and the pulse of the controlled light has a wide peak, the timing jitter tolerance is much smaller than the gate width Δ T. In this case, waveform distortion and intensity fluctuation tend to occur in the light output at the optical gate, whereas in the first optical 3R repeater, since the peak of the pulse of the controlled light is much narrower than that in the comparison example, although the shape of the gate window along the time axis has a small top flat portion, the timing jitter tolerance is greater than that in the comparison example. In this case, almost no waveform distortion occurs in the light output at the optical gate 3a, and only a little fluctuation in the intensity occurs.

In the second optical 3R repeater, the optical pulse (intermediate signal light) having a considerably small pulse time width is output at the optical gate 3a and is supplied to the optical gate 3b, while the optical clock pulse having a large pulse time width is supplied as controlled light to the optical gate 3b. In this case, the optical gate 3b is operated in a state wherein the controlled light having a large pulse time width is sandwiched between the control lights having small pulse time widths, and a large timing jitter tolerance can be obtained.

Figure 11:
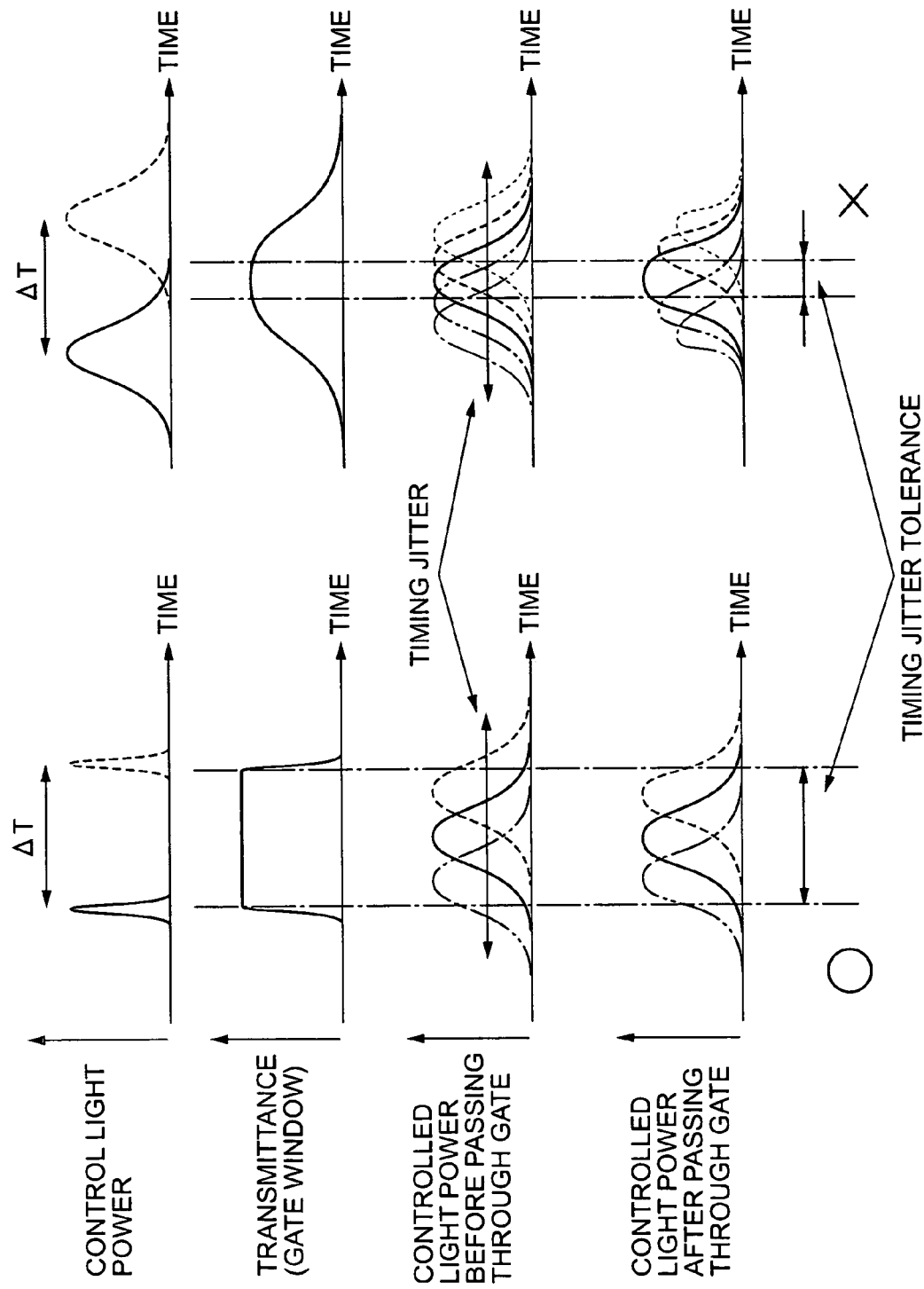
FIG. 11(a) is a diagram a timing jitter tolerance of a second optical 3R repeater of the first embodiment of the present invention, and (b) is a diagram of a timing jitter tolerance of a comparison example.

The timing jitter tolerance for the second optical 3R repeater is shown in FIG. 11(a), and as a comparison example, the timing jitter tolerance when the pulse time widths of both the control light and the controlled light are large is shown in FIG. 11(b). The comparison example in FIG. 11(b) is the same as that in FIG. 10(b).

In the comparison example, since the timing jitter tolerance is small, distortion of the waveform and fluctuation of the intensity tend to occur in the light output at the optical gate. In contrast, for the second optical 3R repeater, since the pulse time width of the control light is sufficiently small, the shape of the gate window along the time axis is a rectangle for which the top flat portion is large, and accordingly, the timing jitter tolerance is larger than that in the comparison example. Generally, a timing jitter tolerance having a width near the gate width Δ T is obtained. In this case, even when the pulse time width of the controlled light is large, almost no waveform distortion and no intensity fluctuation occur in the light output at the optical gate 3b.

As is described above, according to the optical signal regenerative repeater in this embodiment, since the first and the second optical 3R repeaters have large timing jitter tolerances, waveform distortion and intensity fluctuation can be suppressed in the output light, even when the pulse time width of the optical communication signal pulse is extended. Therefore, during the DWDM, high-capacity transmissions for which the pulse time width of the optical communication signal pulse is set at about half the bit period at the Fourier transform limit, waveform distortion and intensity fluctuation, which are conventional problems, can be suppressed in the output light.

As is shown in FIG. 10(a), since the gate window along the time axis for the first optical 3R repeater has a dome-like shape, the output light intensity for the optical gate 3a differs for the controlled optical pulse that is located in the center of the gate time window and the controlled light that is located on either side at the center. Therefore, the intensity of the output light of the optical gate 3a fluctuates, however, this fluctuation is suppressed by the second optical 3R repeater. Specifically, for the second optical 3R repeater, since the shape of the gate window along the time axis is a rectangle, as is shown in FIG. 11(a), at the same intensity the controlled light pulses are output at the optical gate 3b within the range for the gate time window, even when the intermediate signal light, the intensity of which more or less fluctuates, is supplied to the optical gate 3b.

According to this embodiment, the wavelength λ 1 of the optical communication signal, the wavelength λ 2 of the optical clock pulse generated by the clock extraction unit 2a (the same as the wavelength of the optical pulse output at the optical gate 3a) and the wavelength λ 3 of the optical clock pulse generated by the clock extraction unit 2b (the same as the wavelength of the optical pulse output at the optical gate 3b) can be arbitrarily set in accordance with the design of the optical signal regenerative repeater. In the order for the input and output wavelengths of the optical signal regenerative repeater to be the same, the wavelength λ 3 of the optical clock pulse generated by the clock extraction unit 2b may be set to match the wavelength λ 1 of the optical communication signal pulse.

Furthermore, the pulse time width of the optical communication signal pulse, the pulse time width of the optical clock pulse generated by the clock extraction unit 2a (the same as the pulse time width of the optical pulse output at the optical gate 3a), and the pulse time width of the optical clock pulse generated by the clock extraction unit 2b (the same as the pulse time width of the optical pulse output at the optical gate 3b) can be set to values appropriate for communication. When the optical signal regenerative repeater of this embodiment is to be employed for DWDM, high-capacity transmissions, the time widths of both the optical communication signal pulse and the optical clock pulse generated by the clock extraction unit 2b are defined as being about half the bit period at the Fourier transform limit, in order to obtain the maximum spectral efficiency.

The following clock extraction units may be used for the optical signal regenerative repeater in the embodiment.

(1) Optoelectronic converter and mode-locked laser:

By using an electric High-Q filter, for example, an electric clock is extracted from an electric signal obtained by optoelectronic conversion for an optical communication signal pulse, and the extracted electric clock is transmitted to the mode-locked laser to output a synchronized pulse. The output pulse time width at this time is unique to the laser. When a variable-pulse-width mode-locked laser is employed, clock light having an arbitrary time width can be output.

(2) Only mode-locked laser (disclosed in, for example, H. Kurita et al., IEICE Trans. Electron., E81-C, 129 (1998)):

In this case, an optical communication signal pulse is directly input to a mode-locked laser to output a synchronized pulse. Also at this time, the output pulse time width is unique to the laser. When a variable-pulse-width mode-locked laser is employed, clock light having an arbitrary time width can be output.

(3) CW laser including a optoelectronic converter and a light intensity modulator (disclosed in, for example, B. Lavigne et al., Proc. of ECOC 2001, We.F.2.6, (2002)):

An electric clock is extracted from an electric signal obtained by the optoelectronic conversion of an optical communication signal pulse, and a light intensity modulator is driven, based on the extracted electric clock, to generate a clock pulse from CW light. The output pulse time width at this time depends on the shape of the modulation performed along the time axis. Since the shape along the time axis of the electric clock that is extracted by using a High-Q filter is substantially a sine wave, while it is difficult to generate a short pulse, it is possible to generate a pulse having a time width of about half the bit period.

The configuration (1) or (2) is appropriate for the clock extraction unit 2a in case the output of a short pulse clock light is required, and one of the configurations (1) to (3) is appropriate for the clock extraction unit 2b in case clock light having a large time width is required.

Furthermore, only the first optical 3R repeater or only the second optical 3R repeater may be used as the optical signal regenerative repeater according to this embodiment of the present invention.

SECOND EMBODIMENT

In the first embodiment, the clock extraction unit 2b of the second optical 3R repeater extracts a clock from the intermediate signal light that is output at the optical gate 3a of the first optical 3R repeater. However, a clock may be extracted from a optical clock pulse generated by the clock extraction unit 2a (diversion of a clock). An explanation will now be given for a second embodiment for which such a clock diversion is adopted.

Figure 12:
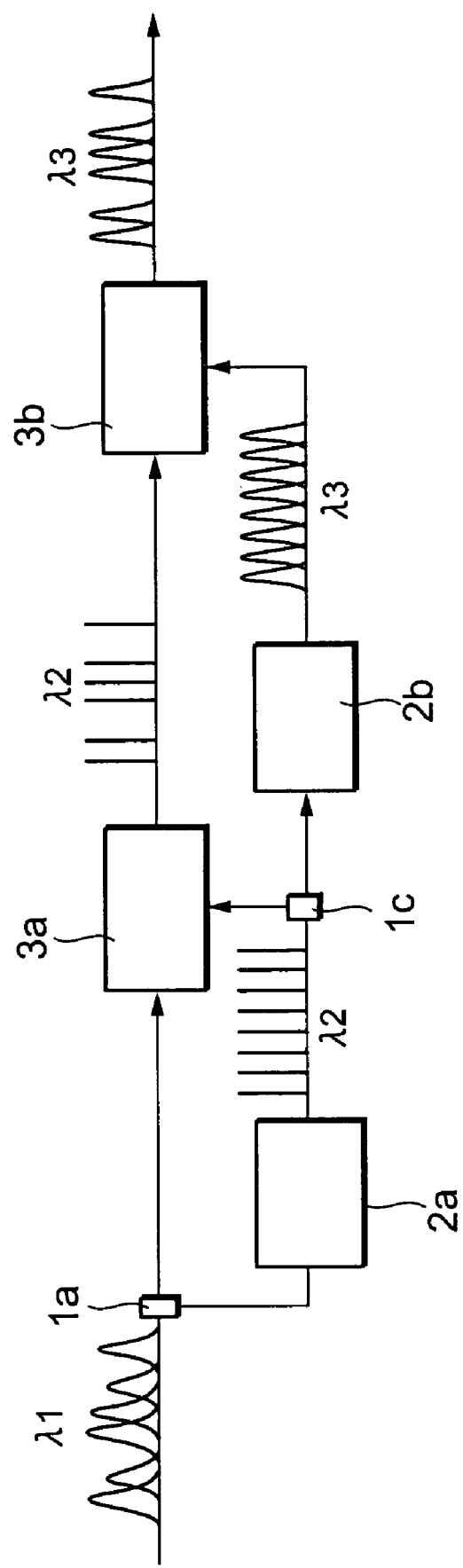
FIG. 12 is a schematic block diagram showing the configuration of an optical signal regenerative repeater according to a second embodiment of the present invention.

FIG. 12 is a schematic block diagram showing the configuration of an optical light regenerative repeater according to a second embodiment of the present invention. This optical signal regenerative repeater has the same configuration as that in FIG. 9 for the first embodiment, except that a optical clock pulse output by a clock extraction unit 2a is divided into two by an optical branching device 1c, and that one of the obtained optical clock pulses is supplied as controlled light to an optical gate 3a while the other is supplied to a clock extraction unit 2b. The same reference numerals as in FIG. 9 are provided for corresponding components in FIG. 12.

For the optical signal regenerative repeater for the second embodiment as well as for the first embodiment, in a first optical 3R repeater, the optical gate 3a is operated in a state wherein a optical clock pulse (controlled light) having a small pulse time width is sandwiched between optical communication signal pulses (control lights) having large pulse time widths. In a second optical 3R repeater, an optical gate 3b is operated in a state wherein a optical clock pulse (controlled light) having a large pulse time width is sandwiched between intermediate signal lights (control lights) having small pulse time widths. Therefore, a high tolerance for a gate timing (timing jitter tolerance) can be obtained for the first and the second optical 3R repeaters. Furthermore, the wavelength distortion and the intensity fluctuation of the gate output light can also be suppressed.

THIRD EMBODIMENT

A wavelength converter and a pulse width converter can be employed instead of the clock extraction unit 2b in the second optical 3R repeater according to the second embodiment. An explanation will now be given for an optical signal regenerative repeater that adopts such a configuration.

Figure 13:
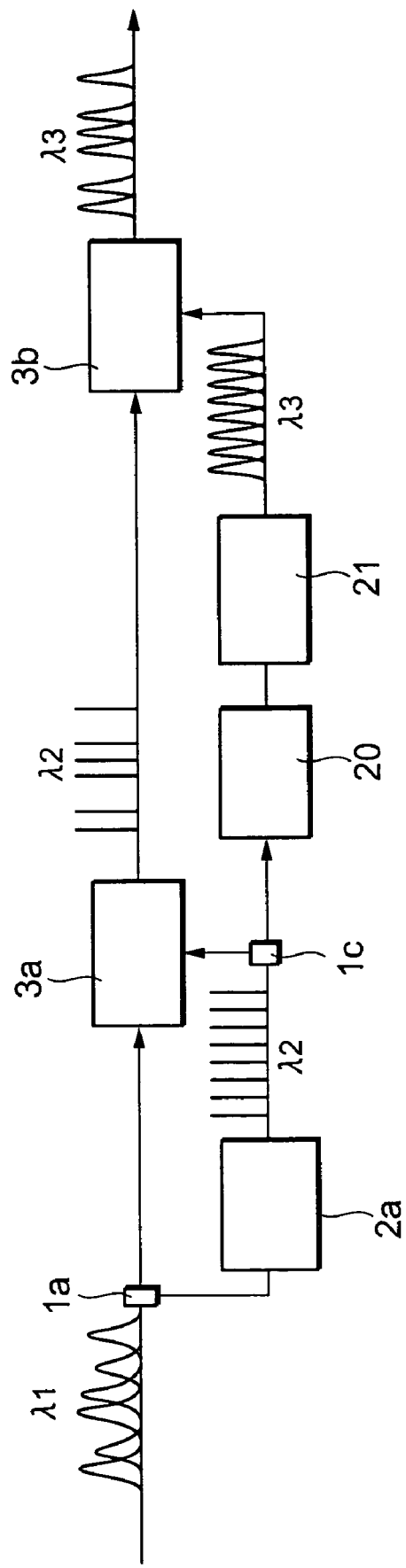
FIG. 13 is a schematic block diagram showing the configuration of an optical signal regenerative repeater according to a third embodiment of the present invention.

FIG. 13 is a schematic block diagram showing the configuration of an optical signal regenerative repeater according to a third embodiment of the present invention. This optical signal regenerative repeater is so designed that in the configuration in FIG. 9 the clock extraction unit 2b is replaced with a wavelength converter 20 and a pulse width converter 21. The same reference numerals are provided for the corresponding components in FIG. 13.

A optical clock pulse (wavelength λ 2) output by a clock extraction unit 2a is divided into two by an optical branching device 1c, and one of the obtained optical clock pulses is supplied as controlled light to an optical gate 3a, while the other is supplied to the wavelength converter 20. The wavelength converter 20 converts the wavelength of the received optical clock pulse (wavelength λ 2) into a wavelength λ 3 (≠λ 2). Then, the optical clock pulse (wavelength λ 3) obtained by the wavelength converter 20 is transmitted to the pulse width converter 21.

The pulse width converter 21 converts, into a proper pulse time width, the pulse time width of the optical clock pulse (wavelength λ 3) received from the wavelength converter 20. The proper pulse time width is the one appropriate for an optical communication system, and can be set as needed. This pulse width converter 21 can be a wavelength band-pass filter for a narrow band. The optical clock pulse (wavelength λ 3) processed by the pulse width converter 21 is transmitted as controlled light to an optical gate 3b.

For the optical signal regenerative repeater for this embodiment as well as for the first embodiment, in the first optical 3R repeater, the optical gate 3a is operated in a state wherein a optical clock pulse (controlled light) having a small pulse time width is sandwiched between optical communication signal pulses (control lights) having large pulse time widths. In the second optical 3R repeater, the optical gate 3b is operated in a state wherein a optical clock pulse (controlled light) having a large pulse time width is sandwiched between intermediate signal lights (control lights) having small pulse time widths. Therefore, a high tolerance for a gate timing (timing jitter tolerance) can be obtained for both the first and the second optical 3R repeaters. Further, wavelength distortion and intensity fluctuation of the gate output light can also be suppressed.

FOURTH EMBODIMENT

Figure 14:
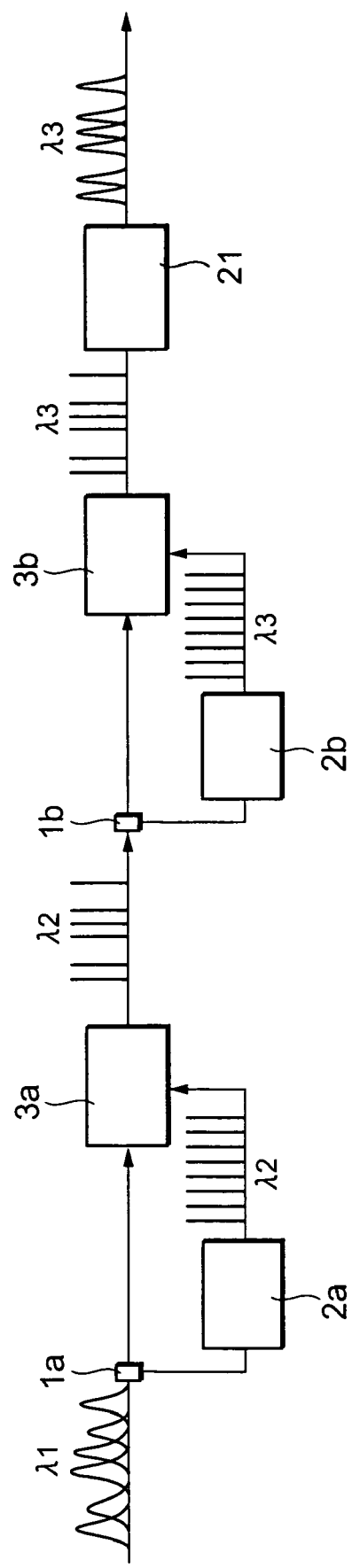
FIG. 14 is a schematic block diagram showing the configuration of an optical signal regenerative repeater according to a fourth embodiment of the present invention.

FIG. 14 is a schematic block diagram showing the configuration of an optical signal regenerative repeater according to a fourth embodiment of the present invention. This optical signal regenerative repeater has the same configuration as that in FIG. 9 for the first embodiment, except that a clock extraction unit 2b generates a optical clock pulse having a considerably small pulse time width, and a pulse width converter 21, such as a wavelength band-pass filter for a narrow band converts the pulse time width of signal light output at an optical gate 3b, into a proper pulse time width. The proper pulse time width is one appropriate for optical communication, and can be set as needed. For the high capacity DWDM transmission, the proper pulse time width is set to the pulse time width of an optical communication signal pulse received by a first 3R repeater. The same reference numerals are provided for the corresponding components in FIG. 14.

For the optical signal regenerative repeater of this embodiment as well as for the first embodiment, in the first optical 3R repeater, an optical gate 3a is operated in a state wherein a optical clock pulse (controlled light) having a small pulse time width is sandwiched between optical communication signals (control lights) having large pulse time widths. In the second optical 3R repeater, the optical gate 3b is operated in a state (as shown in FIG. 8(a)) wherein a optical clock pulse (controlled light) having a small pulse time width is sandwiched between intermediate signal lights (control lights) having small time pulse widths. In this case, since the controlled light also has a small time pulse width, the gate window having substantially a rectangular shape is obtained for the optical gate 3b, and in addition, since the width at the peak of the controlled optical pulse is reduced, a higher tolerance for a gate timing (timing jitter tolerance) than that in the first embodiment can be obtained. Moreover, waveform distortion and intensity fluctuation of the gate output light can also be suppressed.

FIFTH EMBODIMENT

Figure 15:
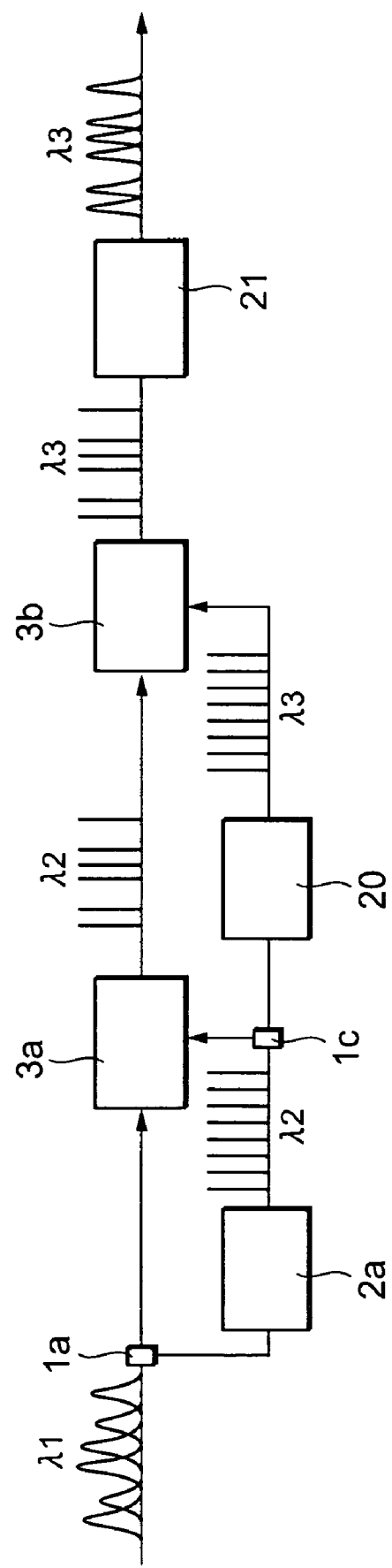
FIG. 15 is a schematic block diagram showing the configuration of an optical signal regenerative repeater according to a fifth embodiment of the present invention.

FIG. 15 is a schematic block diagram showing the configuration of an optical signal regenerative repeater according to a fifth embodiment of the present invention. This optical signal regenerative repeater has the same configuration as that in FIG. 13 for the third embodiment, except that a pulse width converter 21 is located in the output stage of an optical gate 3b. The same reference numerals are provided for the corresponding components in FIG. 15.

An optical clock-pulse (wavelength λ 2) is divided into two by an optical branching device 1c, and one of the obtained optical clock pulses is supplied as controlled light to an optical gate 3a, while the other is supplied to a wavelength converter 20. The wavelength converter 20 converts the wavelength of the received optical clock pulse (wavelength λ 2) into wavelength λ 3 (≠λ 2), and the optical clock pulse (wavelength λ 3) obtained by the wavelength converter 20 is supplied as controlled light to the optical gate 3b. The optical pulse (wavelength λ 3) output at the optical gate 3b is converted into a proper pulse time width by the pulse time width converter 21.

For the optical signal regenerative repeater of this embodiment as well as for the first embodiment, in the first optical 3R repeater, the optical gate 3a is operated in a state wherein a optical clock pulse (controlled light) having a small pulse time width is sandwiched between optical communication signal pulses (control lights) having large pulse time widths. In the second optical 3R repeater, as well as for the above described fourth embodiment, the optical gate 3b is operated in a state wherein a optical clock pulse (controlled light) having a small pulse time width is sandwiched between intermediate signal lights (control lights) having small pulse time widths. Therefore, a high tolerance for a gate timing (timing jitter tolerance) can be obtained for both the first and the second optical 3R repeaters. In addition, waveform distortion and intensity fluctuation of the gate output light can be suppressed.

SIXTH EMBODIMENT

Figure 16:
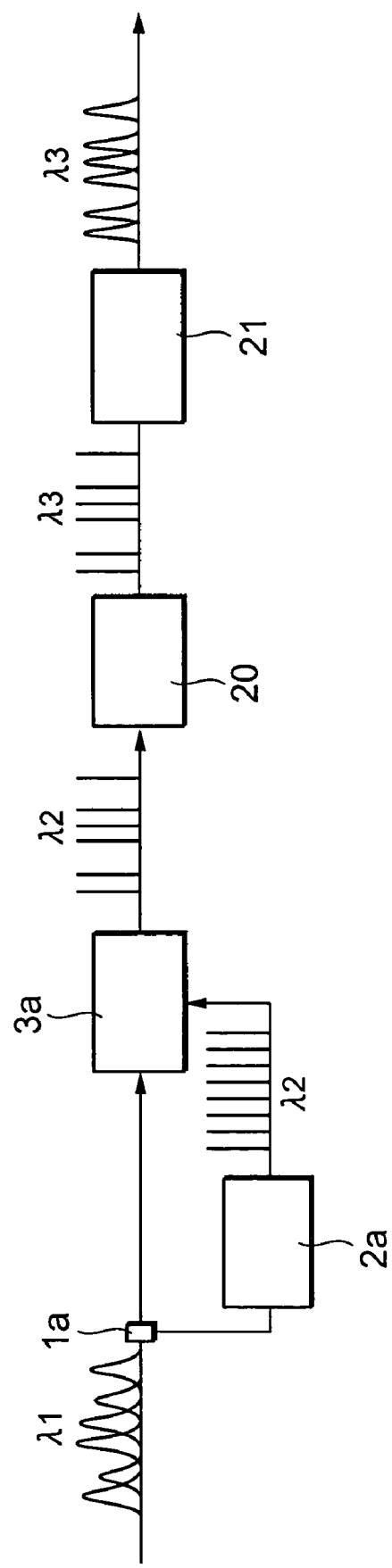
FIG. 16 is a schematic block diagram showing the configuration of an optical signal regenerative repeater according to a sixth embodiment of the present invention.

FIG. 16 is a schematic block diagram showing the configuration of an optical signal regenerative repeater according to a sixth embodiment of the present invention. This optical signal regenerative repeater is so designed that the second optical 3R repeater in the configuration in FIG. 9 is replaced with a wavelength converter 20 and a pulse width converter 21. The same reference numerals are provided for the corresponding components in FIG. 16.

Intermediate signal light (wavelength λ 2) output at an optical gate 3a is supplied to the wavelength converter 20. The wavelength converter 20 converts the wavelength of the received intermediate signal light (wavelength λ 2) into a wavelength λ 3 (≠λ 2). The optical pulse (wavelength λ 3) obtained by the wavelength converter 20 is supplied to the pulse width converter 21.

The pulse width converter 21 converts, into a proper pulse time width, the pulse time width of the optical pulse (wavelength λ 3) received from the wavelength converter 20. The proper pulse time width is one appropriate for optical communication, and for the high capacity DWDM transmissions, the pulse time width is set to that of an optical communication signal pulse received by a first 3R repeater. The pulse width converter 21 can be a wavelength band-pass filter for a narrow band. The optical pulse (wavelength λ 3) processed by the pulse width converter 21 is output as a regenerated optical communication signal pulse by the optical signal regenerative repeater of this embodiment.

For the optical signal regenerative repeater in this embodiment as well as for the above described first embodiment, in the first optical 3R repeater, an optical gate 3a is operated in a state wherein a optical clock pulse (controlled light) having a small pulse time width is sandwiched between optical communication signal pulses (control lights) having large pulse time widths. Therefore, a high tolerance for a gate timing (timing jitter tolerance) can be obtained. Distortion of the waveform for the gate output can also be suppressed.

SEVENTH EMBODIMENT

Figure 17:
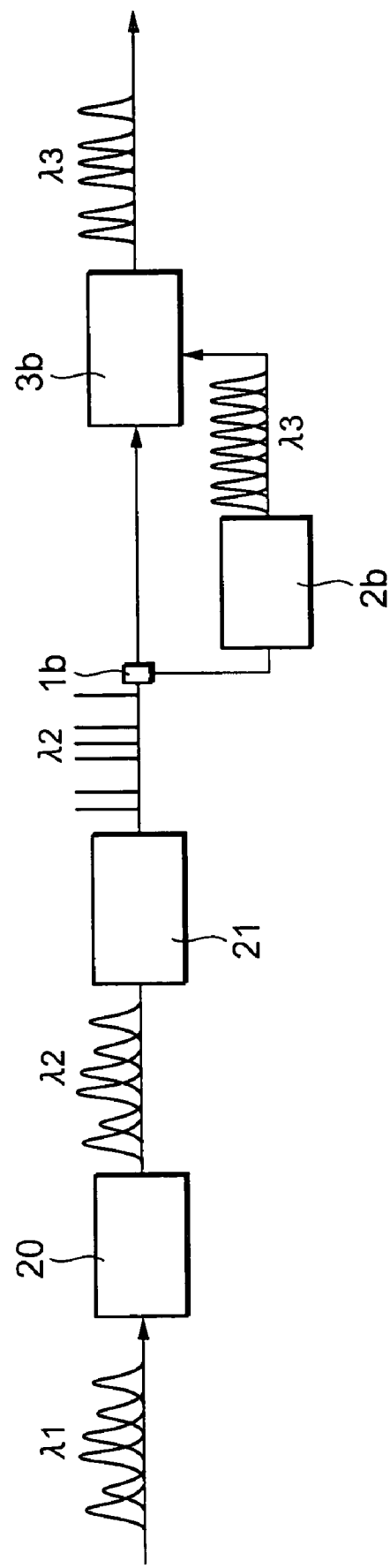
FIG. 17 is a schematic block diagram showing the configuration of an optical signal regenerative repeater according to a seventh embodiment of the present invention.

FIG. 17 is a schematic block diagram showing the configuration of an optical signal regenerative repeater according to a seventh embodiment of the present invention. This optical signal regenerative repeater is so designed that the first optical 3R repeater in the configuration shown in FIG. 9 is replaced with a wavelength converter 20 and a pulse width converter 21. The same reference numerals are provided for the corresponding components in FIG. 17.

The wavelength converter 20 converts the wavelength of the deteriorated optical communication signal pulse (wavelength λ 1) into a wavelength λ 2. The optical communication signal pulse (wavelength λ 2) obtained by the wavelength converter 20 is supplied to the pulse width converter 21. The pulse width converter 21 converts into a proper pulse time width the pulse time width of the optical communication signal (wavelength λ 2) received from the wavelength converter 20. The proper pulse time width is a small pulse time width so that a high timing jitter tolerance can be obtained for the optical gate 3b. The optical pulse (wavelength λ 2) processed by the pulse width converter 21 is supplied as intermediate signal light to the second 3R repeater.

For the optical signal regenerative repeater of this embodiment as well as for the above described first embodiment, the optical gate 3b is operated in a state wherein a optical clock pulse (controlled light) having a large pulse time width is sandwiched between intermediate signal lights (control lights) having small pulse time widths. Therefore, a high tolerance for a gate timing (timing jitter tolerance) can be obtained. Further, waveform distortion and intensity fluctuation of the gate output light can be suppressed.

EIGHTH EMBODIMENT

Figure 18:
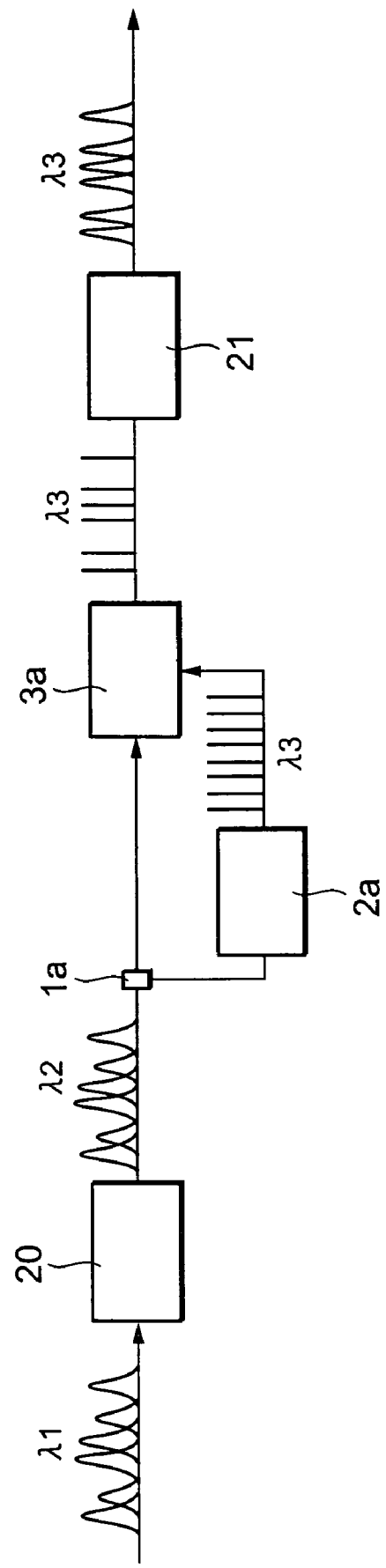
FIG. 18 is a schematic block diagram showing the configuration of an optical signal regenerative repeater according to an eighth embodiment of the present invention.

FIG. 18 is a schematic block diagram showing the configuration of an optical signal regenerative repeater according to an eighth embodiment of the present invention. This optical signal regenerative repeater is so designed that the second optical 3R repeater in the configuration shown in FIG. 9 is deleted, and a wavelength converter 20 and a pulse width converter 21 are located in the front and rear stages of the first optical 3R repeater. The same reference numerals are provided for the corresponding components in FIG. 18.

The wavelength converter 20 converts, into a wavelength λ 2, the wavelength of an optical communication signal pulse (wavelength λ 1) having a large pulse time width. The optical communication signal pulse (wavelength λ 2) obtained by the wavelength converter 20 is divided into two by an optical branching device 1a, and one of the obtained optical communication signal pulses is supplied as control light to an optical gate 3a, while the other optical communication signal pulse is supplied to a clock extraction unit 2a.

The clock extraction unit 2a extracts the clock of the optical communication signal pulse received from the branching device 1a, and employs the extracted clock to generate a optical clock pulse that has a considerably small pulse time width and a wavelength λ 3. The optical clock pulse generated by the clock extraction unit 2a is supplied as controlled light to the optical gate 3a.

In accordance with the optical communication signal received from the optical branching device 1a, the optical gate 3a is opened or closed to transfer communication data to the optical clock pulse received from the clock extraction unit 2a. Thereafter, the optical clock pulse having the considerably small pulse time width, to which the communication data have been transferred, is supplied to the pulse width converter 21.

The pulse width converter 21 converts, into a proper pulse time width, the pulse time width of the optical clock pulse (wavelength λ 3) received from the optical gate 3a. The proper pulse time width is one appropriate for an optical communication system, and to perform the high capacity DWDM transmissions, the pulse time width is set to the pulse time width of an optical communication signal pulse received by the first optical 3R repeater.

For the optical signal regenerative repeater of this embodiment as well as for the above described first embodiment, the optical gate of the first optical 3R repeater is operated in a state wherein a optical clock pulse (controlled light) having a small pulse time width is sandwiched between deteriorated communication pulses (control lights) having large pulse time widths. Therefore, a large tolerance for a gate timing (timing jitter tolerance) can be obtained. Waveform distortion of the gate output can also be suppressed.

In the embodiments described above, the changes in the wavelength in the optical gates (or the wavelength converters) of the first and the second optical 3R repeaters may be set so they offset each other. That is, when the wavelength λ 3 is set equal to the wavelength λ 1, the input and output wavelength of the optical signal regenerative repeater are same. Further, an arbitrary wavelength can be output when the optical signal regenerative repeater of this invention is employed for an area wherein wavelength conversion is effectively utilized, such as an optical cross connection for optical communication.

EXAMPLES

Examples for the above described optical signal regenerative repeater of the present invention will now be described. Here, a specific configuration for an optical gate will mainly be explained.

Example 1

Figure 19:
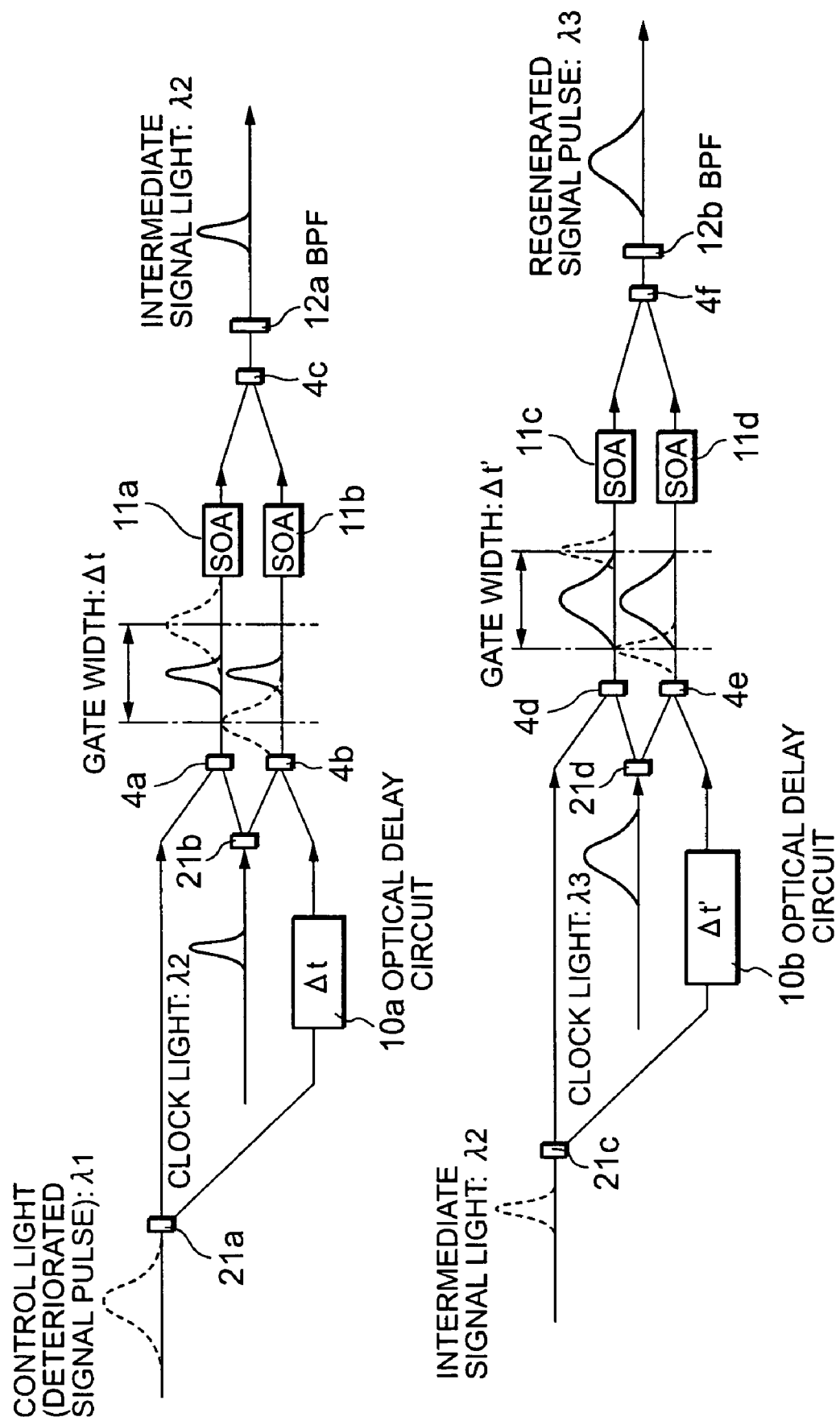
FIG. 19 is a block diagram showing a configuration according to a first example of the present invention.

FIG. 19 shows series of two optical 3R repeaters that employ SMZ optical gates in accordance with a first example for the optical signal regenerative repeater of the invention.

In this example, an optical communication signal pulse (λ 1) having a large pulse time width is supplied to a first SMZ optical gate and a first clock extraction unit (not shown) that constitute an optical 3R repeater at a first stage. The first clock extraction unit extracts a clock from the received optical communication signal pulse (wavelength λ 1) and generates a optical clock pulse (wavelength λ 2) that is synchronized with the extracted clock and has a small pulse time width. This optical clock pulse (wavelength λ 2) is supplied as controlled light to the first SMZ optical gate.

The first SMZ optical gate receives the optical communication signal pulse as control light, and also receives the optical clock pulse as controlled light from the first extraction unit. An optical branching device 21a divides the received optical communication signal pulse into first and second optical communication signal pulses. The first optical communication signal pulse is transmitted through an optical coupler 4a to a nonlinear phase shifter 11a that is a semiconductor optical amplifier (SOA), while the second optical communication signal pulse is delayed by an optical delay circuit 10a for a delay time Δt, and is then transmitted through an optical coupler 4b to a nonlinear phase shifter 11b that is a semiconductor optical amplifier (SOA). The optical clock pulse received from the first extraction unit is divided by an optical branching device 21b into first and second optical clock pulses. The first optical clock pulse is transmitted through the optical coupler 4a to the nonlinear phase shifter 11a, while the second optical clock pulse is transmitted through the optical coupler 4b to the nonlinear phase shifter 11b.

At the same time, the first and the second optical clock pulses respectively arrive at the nonlinear phase shifters 11a and 11b. The time the first optical communication signal pulse arrives at the nonlinear phase shifter 11a is earlier than the time the first optical clock pulse arrives at the nonlinear phase shifter 11a. The time the second optical communication signal pulse arrives at the nonlinear phase shifter 11b is later than the time whereat the second optical clock pulse arrives at the nonlinear phase shifter 11b.

In accordance with the arrival times, the first SMZ optical gate is operated in a state wherein, along the time axis, the first optical clock pulse (or the second optical clock pulse), which is controlled light, is sandwiched between the first and the second optical communication signal pulses, which are control lights. Further, in the nonlinear phase shifter 11a, a nonlinear phase shift occurs in the first optical clock pulse based on the first optical communication signal pulse, while in the nonlinear optical phase shifter 11b, the second optical clock pulse passes through unchanged without being affected by the nonlinear phase shift because the second optical clock pulse arrives before the second optical communication signal pulse.

The first and the second optical clock pulses, which have passed through the nonlinear phase shifters 11a and 11b, arrive at an optical coupler 4c. The optical coupler 4c outputs an optical pulse only when, due to an interference, a phase difference occurs between the controlled light pulses that are received. When there is no phase difference, no optical pulse is output because the controlled light pulses cancel out each other. Since, in case there is the control pulse, there is a phase difference between the first optical clock pulse, for which the nonlinear phase shift is performed by the nonlinear phase shifter 11a, and the second optical clock pulse, for which the nonlinear phase shift is not performed by the nonlinear phase shifter 11b, the optical coupler 4c outputs an optical pulse (wavelength λ2) that is obtained by synthesizing the first and the second optical clock pulses. The optical pulse output by the optical coupler 4c is passed through a wavelength band-pass filter (BPF) 12a, and is output as intermediate signal light (wavelength λ2) by the optical 3R repeater at the first stage.

The intermediate signal light output by the optical 3R repeater at the first stage is transmitted to a second SMZ optical gate and a second clock extraction unit (not shown) that constitute an optical 3R repeater at the second stage. The second clock extraction unit extracts a clock from intermediate signal light (wavelength λ2) received from the optical 3R repeater at the first stage, and generates a optical clock pulse (wavelength λ3) that is synchronized with the extracted clock and has a large pulse time width. This optical clock pulse is transmitted as controlled light to the second SMZ optical gate.

The second SMZ optical gate receives the intermediate signal light as control light from the optical 3R repeater at the first stage, and also receives the optical clock pulse as controlled light from the second clock extraction unit. An optical branching device 21c divides the received intermediate signal light into first and second intermediate signal lights. The first intermediate signal light is transmitted through an optical coupler 4d to a nonlinear phase shifter 11c that is a semiconductor optical amplifier (SOA), while the second intermediate signal light is delayed by an optical delay circuit 10b for a delay time Δt', and is transmitted through an optical coupler 4e to a nonlinear phase shifter 11d that is a semiconductor optical amplifier (SOA). The optical clock pulse transmitted by the second clock extraction unit is divided by an optical branching device 21d into first and second optical clock pulses. The first optical clock pulse is transmitted through the optical coupler 4d to the nonlinear phase shifter 11c, while the second optical clock pulse is transmitted through the optical coupler 4e to the nonlinear phase shifter 11d.

At the same time, the first and the second optical clock pulses arrive at the nonlinear phase shifters 11c and 11d. The time the first intermediate signal light arrives at the nonlinear phase shifter 11c is earlier than the time the first optical clock pulse arrives at the nonlinear phase shifter 11c. The time the second optical clock pulse arrives at the nonlinear phase shifter 11d is later than the time the second optical clock pulse arrives at the nonlinear phase shifter 11d.

According to the above described arrival times, the second SMZ optical gate is operated in a state wherein, along the time axis, the first optical clock pulse (or the second optical clock pulse) that is controlled light is sandwiched between the first and the second intermediate signal lights that are control lights. Further, in the nonlinear phase shifter 11c, a nonlinear phase shift occurs for the first optical clock pulse due to the first intermediate signal light, and in the nonlinear optical phase shifter 11d, nonlinear phase shift occurs for the second optical clock pulse because the second optical clock pulse arrives before the second intermediate signal light.

The first and the second optical clock pulses, which have passed through the nonlinear optical phase shifters 11c and 11d, arrive at an optical coupler 4f. The optical coupler 4f outputs an optical pulse only when, due to an interference, a phase difference occurs between the controlled optical pulses that are input. When there is no phase difference, the optical pulse is not output because the controlled optical pulses cancel out each other. Since, in case there is the control pulse, there is a phase difference between the first optical clock pulse, for which the nonlinear phase shift is performed by the nonlinear phase shifter 11c, and the second optical clock pulse, for which the nonlinear phase shift is not performed by the nonlinear phase shifter 11d, the optical coupler 4f outputs an optical pulse (λ3) that is obtained by synthesizing the first and the second optical clock pulses. The optical pulse output by the optical coupler 4f is passed through a wavelength band-pass filter (BPF) 12b, and is output externally, as a regenerated optical communication signal pulse (wavelength λ3), by the optical signal regenerative repeater.

When the optical signal regenerative repeater in this embodiment is employed for the DWDM, high-capacity transmissions for which the time width of the optical communication signal pulse is about half the bit period and at the Fourier transform limit, the pulse time width of a optical clock pulse that is generated by the first clock extraction unit is set considerably smaller than the bit period and the gate width (Δt), while the pulse time width of a optical clock pulse that is generated by the second clock extraction unit is set equal to that of the optical communication signal pulse.

Further, the wavelength λ3 of the regenerated signal pulse and the wavelength λ1 of the optical communication signal pulse may be the same or may differ. When the wavelengths λ 1 and λ 3 are the same, an optical signal regenerative repeater having the same input and output wavelengths can be provided.

Example 2

Figure 20:
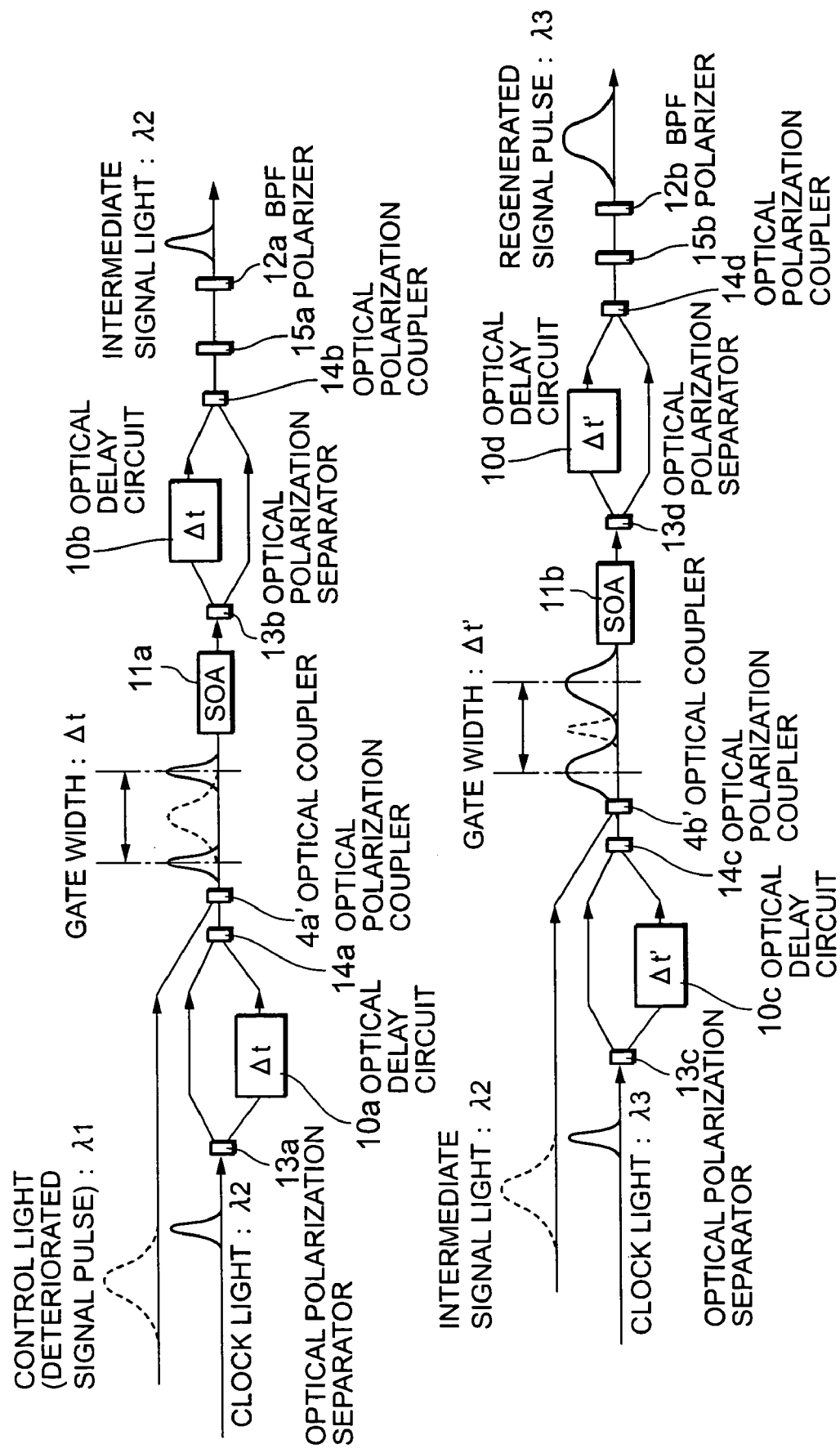
FIG. 20 is a block diagram showing a configuration according to a second example of the present invention.

FIG. 20 shows an optical signal regenerative repeater according to a second example of the present invention wherein two optical 3R repeaters that employ PD-SMZ (UNI) optical gates are connected.

In the optical signal regenerative repeater for this example, an optical communication signal pulse (wavelength λ 1) is supplied to a first PD-SMZ (UNI) optical gate and a first clock extraction unit (not shown) that constitute an optical 3R repeater at the first stage. The first clock extraction unit extracts a clock from the received optical communication signal pulse (wavelength λ 1) and generates a optical clock pulse (wavelength λ 2) that is synchronized with the extracted clock and has a small pulse time width. This optical clock pulse (wavelength λ 2) is supplied as controlled light to the first PD-SMZ (UNI) optical gate.

At the first PD-SMZ (UNI) optical gate, the optical clock pulse received from the first clock extraction unit is divided by an optical polarization separator 13a into first and second polarized component pulses, the polarization axes of which orthogonally intersect each other. The second polarized component pulse is delayed by an optical delay circuit 10a for a relative delay time Δ t, and is coupled with the first polarized component pulse by an optical polarization coupler 14a. The thus coupled first and second polarized pulses are sequentially supplied, through an optical coupler 4a', to a nonlinear phase shifter 11a that is a semiconductor optical amplifier (SOA). The optical communication signal pulse is transmitted through the optical coupler 4a' to the nonlinear phase shifter 11a.

The time the optical communication signal pulse arrives at the nonlinear phase shifter 11a is later than the time the first polarized component pulse arrives at the nonlinear phase shifter 11a, and is earlier than the time the second polarized component pulse arrives at the nonlinear phase shifter 11a. In accordance with these arrival times, the first PD-SMZ (UNI) optical gate is operated in a state wherein, along the time axis, the optical communication signal pulse that is control light is sandwiched between the first and the second polarized component pulses that are controlled lights.

Since the first polarized component pulse arrives at the nonlinear phase shifter 11a before the optical communication signal pulse, the first polarized component pulse passes through unchanged without being affected by the nonlinear phase shift. Since the second polarized component pulse arrives at the nonlinear phase shifter 11a after the optical communication signal pulse, the second polarized component pulse is affected by the nonlinear phase shift due to the optical communication signal pulse. The first and the second polarized component pulses, which are passed through the nonlinear phase shifter 11a, are again divided by an optical polarization separator 13b. The thus obtained first polarized component pulse is delayed by an optical delay circuit 10b for a relative time delay Δ t, and is coupled with the second polarized component pulse by an optical polarization coupler 14b. The thus coupled first and second polarized component pulses interfere with each other and are synthesized, and thereafter, an arbitrary linear polarized component is selected by a polarizer 15a. The pulse of the selected linear polarized component passes through a wavelength band-pass filter (BPF) 12a, and is output as intermediate signal light (wavelength λ 2) by the optical 3R repeater at the first stage.

The intermediate signal light output by the optical 3R repeater at the first stage is supplied to a second PD-SMZ (UNI) optical gate and a second clock extraction unit (not shown) that constitute an optical 3R repeater at the second stage. The second clock extraction unit extracts a clock from the intermediate signal light (wavelength λ 2) that is transmitted by the optical 3R repeater at the first stage, and generates a optical clock pulse (wavelength λ 3) that is synchronized with the extracted clock and has a large pulse time width. This optical clock pulse is transmitted as controlled light to the second PD-SMZ (UNI) optical gate.

At the second PD-SMZ (UNI) optical gate, the optical clock pulse transmitted by the second clock extraction unit is divided by an optical polarization separator 13c into first and second polarized component pulses, the polarization axes of which orthogonally intersect each other. The second polarized component pulse is delayed by an optical delay circuit 10c for a relative delay time Δ t', and is coupled with the first polarized component pulse by an optical polarization coupler 14c. The thus coupled first and second polarized component pulses are sequentially supplied, through an optical coupler 4b', to a nonlinear phase shifter 11b that is a semiconductor optical amplifier (SOA). The intermediate signal light (wavelength λ 2), which is received as control light from the optical 3R repeater at the first stage, is transmitted through the optical coupler 4b' to the nonlinear phase shifter 11b.

The time the intermediate signal light arrives at the nonlinear phase shifter 11b is later than the time the first polarized component pulse arrives at the nonlinear phase shifter 11b, and is earlier than the time the second polarized component pulse arrives at the nonlinear phase shifter 11b. In accordance with these arrival times, the second PD-SMZ (UNI) optical gate is operated in a state wherein, along the time axis, the intermediate signal light (control light) is sandwiched between the first and second polarized component pulses (controlled lights).

Since the first polarized component pulse arrives at the nonlinear phase shifter 11b before the intermediate signal light, the first polarized component pulse passes through without being affected by the nonlinear phase shift, and since the second polarized component pulse arrives at the nonlinear phase shifter 11b after the intermediate signal light, the second polarized component pulse is affected by the nonlinear phase shift due to the intermediate signal light. The first and the second polarized component pulses, which have passed through the nonlinear phase shifter 11b, are again divided by an optical polarization separator 13d. The divided first polarized component pulse is delayed by an optical delay circuit 10d for a relative delay time Δ t', and is coupled with the second polarized component pulse by an optical polarization coupler 14d. The thus coupled first and second polarized component pulses interfere with each other and are synthesized, and an arbitrary linear polarized component is selected by a polarizer 15b. The pulse of the selected linear polarized component passes through a wavelength band-pass filter (BPF) 12b and is output externally as a regenerated optical communication signal pulse (wavelength λ 3) by the optical signal regenerative repeater in this embodiment.

When the optical signal regenerative repeater of this embodiment is employed for the DWDM, high-capacity transmissions for which the time width of the optical communication signal pulse is about half the bit period at the Fourier transform limit, the pulse time width of a optical clock pulse that is generated by the first clock extraction unit is set considerably smaller than the bit period and the gate width (Δ t), and the pulse time width of a optical clock pulse that is generated by the second clock extraction unit is set equal to that of the optical communication signal pulse.

In addition, the wavelength λ 3 of the regenerated signal pulse and the wavelength λ 1 of the optical communication signal pulse may be the same or may differ. When the wavelengths λ 1 and λ 3 are the same, an optical signal regenerative repeater having the same input and output wavelengths can be provided.

In the first PD-SMZ (UNI) optical gate, the wavelength band-pass filter 12a may be positioned immediately after the nonlinear phase shifter 11a or immediately before the polarizer 15a. Further, the optical differential delay section that includes the polarization separators 13a and 13b, the optical delay circuits 10a and 10b and the polarization couplers 14a and 14b may be provided as a single unit by using a birefringent crystal or fiber.

At the second PD-SMZ (UNI) optical gate, the wavelength band-pass filter 12b may be located immediately after the nonlinear phase shifter 11b or immediately before the polarizer 15b. Further, the optical differential delay section that includes the polarization separators 13c and 13d, the optical delay circuits 10c and 10d and the polarization coupler 14c and 14d may be provided as a single unit by using a birefringent crystal or fiber.

Example 3

Figure 21:
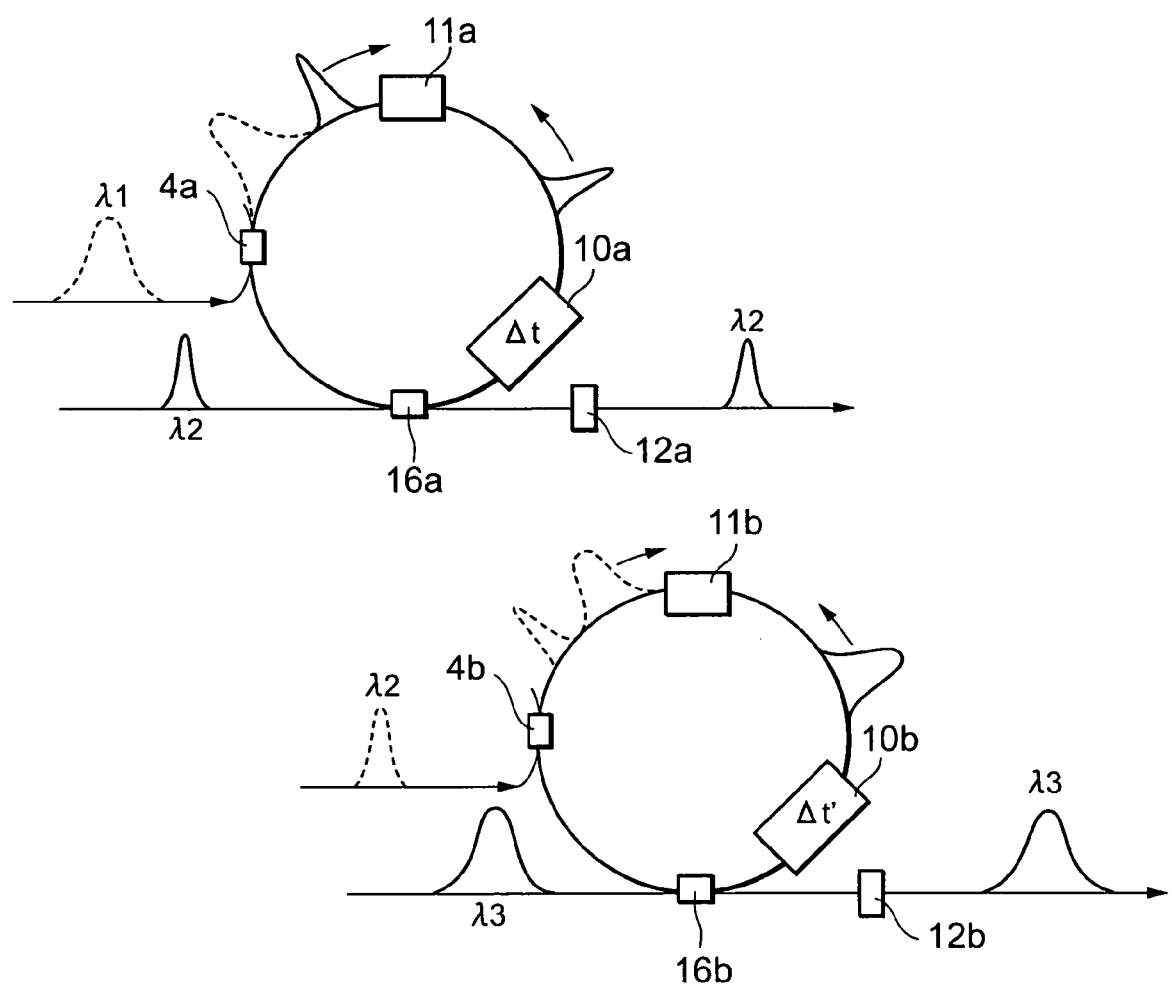
FIG. 21 is a block diagram showing a configuration according to a third example of the present invention.

FIG. 21 shows an optical signal regenerative repeater according to a third example of the present invention wherein two optical 3R repeaters employing NOLM (SLALOM) optical gates are connected.

In the optical signal regenerative repeater for this example, an optical communication signal pulse (wavelength λ 1) having a large pulse time width is supplied to a first NOLM (SLALOM) optical gate and a first clock extraction unit (not shown) that constitute an optical 3R repeater at the first stage. The first extraction clock unit extracts a clock from the received optical communication signal (wavelength λ 1), and generates a optical clock pulse (wavelength λ 2) that is synchronized with the extracted clock and has a small pulse time width. This optical clock pulse (wavelength λ 2) is transmitted as controlled light through a optical coupler 16a to the first NOLM (SLALOM) optical gate.

The first NOLM (SLALOM) optical gate has a loop structure, and a nonlinear optical phase shifter 11a is located along the fiber loop, opposite the optical coupler 16a. On the fiber loop, an optical coupler 4a is located along one of the transmission paths extending between the optical coupler 16a and the nonlinear optical phase shifter 11a, while an optical delay circuit 10a is located along the other transmission path.

The optical clock pulse output by the first clock extraction unit is introduced through the optical coupler 16a into the fiber loop, and the optical communication signal pulse (λ 1) that is control light is introduced through the optical coupler 4a into the fiber loop. When the optical clock pulse has been introduced by the first clock extraction unit through the optical coupler 16a into the fiber loop, the optical clock pulse is separated into a first optical clock pulse, which is transferred clockwise along the fiber loop, and a second optical clock pulse, which is transferred counterclockwise.

The first optical clock pulse arrives directly at the nonlinear optical phase shifter 11a, while the second optical clock pulse is delayed by the optical delay circuit 10a for a delay time Δ t, and then arrives at the nonlinear optical phase shifter 11a. The optical communication signal pulse, which has been introduced through the optical coupler 10a into the fiber loop, is transferred clockwise along the fiber loop and arrives thereafter at the nonlinear optical phase shifter 11a. The nonlinear optical phase shifter 11a receives the first optical clock pulse, the optical communication signal pulse and the second optical clock pulse in the named order. According to these arrival times, the first NOLM (SLALOM) optical gate is operated in a state wherein, along the time axis, the optical communication signal pulse (control light) is sandwiched between the first and second optical clock pulses (controlled lights).

Since the first optical clock pulse arrives at the nonlinear optical phase shifter 11a before the optical communication signal pulse, the first optical clock pulse passes through without being affected by the nonlinear phase shift. Since the second optical clock pulse arrives at the nonlinear optical phase shifter 11a after the optical communication signal pulse, the second optical clock pulse is affected by the nonlinear phase shift due to the optical communication signal pulse.

The second optical clock pulse that passes through the nonlinear phase shifter 11a is transmitted directly to the optical coupler 16a, whereas the first optical clock pulse, which passes through the nonlinear phase shifter 11a, is delayed by the optical delay circuit 10a for a delay time Δ t, and arrives thereafter at the optical coupler 16a. Therefore, the first and the second optical clock pulses arrive at the optical coupler 16a at the same time, and interfere with each other. Since, through this interference, a phase difference occurs between the first and the second optical clock pulses, an optical pulse (wavelength λ 2) obtained by synthesizing these optical clock pulses is extracted outside the fiber loop through the optical coupler 16a. The thus obtained optical pulse passes through a wavelength band-pass filter (BPF) 12a, and is output as intermediate signal light by the optical 3R repeater at the first stage.

The intermediate signal light output by the optical 3R repeater at the first stage is supplied to a second NOLM (SLALOM) optical gate and a second clock extraction unit (not shown) that constitute an optical 3R repeater at the second stage. The second clock extraction unit extracts a clock from the intermediate signal light (wavelength λ 2) received from the optical 3R repeater at the first stage, and generates a optical clock pulse (wavelength λ 3) that is synchronized with the extracted clock and has a large pulse time width. This optical clock pulse is transmitted as controlled light to the second NOLM (SLALOM) optical gate.

The second NOLM (SLALOM) optical gate also has a loop structure, and a nonlinear optical phase shifter 11b is located along the fiber loop, opposite an optical coupler 16b. On the fiber loop, an optical coupler 4b is located along one of the transmission paths extending between the optical coupler 16b and the nonlinear optical phase shifter 11b, while an optical delay circuit 10b is located along the other transmission path.

The optical clock pulse output by the second clock extraction unit is introduced through the optical coupler 16b into the fiber loop, and the intermediate signal light that is control light is introduced through the optical coupler 4b into the fiber loop. When the optical clock pulse from the second clock extraction unit has been introduced through the optical coupler 16b into the fiber loop, the optical clock pulse is divided into a first optical clock pulse, which is transferred clockwise along the fiber loop, and a second optical clock pulse, which is transferred counterclockwise.

The first optical clock pulse arrives directly at the nonlinear optical phase shifter 11b, while the second optical clock pulse is delayed by an optical delay circuit 10b for a delay time Δ t', and then arrives at the nonlinear optical phase shifter 11b. When the intermediate signal light has been introduced through the optical coupler 4b into the fiber loop, the intermediate signal light is transferred clockwise along the fiber loop and then arrives at the nonlinear optical phase shifter 11b. The nonlinear optical phase shifter 11b receives the first optical clock pulse, the intermediate signal light and the second optical clock pulse in the named order. According to these arrival times, the second NOLM (SLALOM) optical gate is operated in a state wherein, along the time axis, the intermediate signal light (control light) is sandwiched between the first and the second optical clock pulses (controlled lights).

Since the first optical clock pulse arrives at the nonlinear optical phase shifter 11b before the intermediate signal light, the first optical clock pulse passes through without being affected by the nonlinear phase shift. Since the second optical clock pulse arrives at the nonlinear optical phase shifter 11b after the intermediate signal light, the second optical clock pulse is affected by the nonlinear phase shift due to the intermediate signal light.

The second optical clock pulse, which passes through the nonlinear phase shifter 11b, arrives directly at the optical coupler 16b, whereas the first optical clock pulse, which passes through the nonlinear phase shifter 11b, is delayed by the optical delay circuit 10b for a delay time $\Delta t'$, and arrives thereafter at the optical coupler 16b. Therefore, the first and the second optical clock pulses arrive at the optical coupler 16b at the same time, and interfere with each other. Since, through this interference, a phase difference occurs between the first and the second optical clock pulses, an optical pulse ($\lambda 3$) obtained by synthesizing these optical clock pulses is extracted outside the fiber loop through the optical coupler 16b. The obtained optical pulse passes through a wavelength band-pass filter (BPF) 12b, and is output as a regenerated signal pulse (wavelength $\lambda 3$) by the optical 3R repeater at the second stage.

When the optical signal regenerative repeater for this example is employed for the DWDM, high-capacity transmissions for which the time width of the optical communication signal pulse is about half the bit period at the Fourier transform limit, the pulse time width of a optical clock pulse that is generated by the first extraction unit is set considerably smaller than the bit period and the gate width ($\Delta t$), and the pulse time width of a optical clock pulse that is generated by the second clock extraction unit is set equal to that of the optical communication signal pulse.

Furthermore, the wavelength $\lambda 3$ of the regenerated signal pulse and the wavelength $\lambda 1$ of the optical communication signal pulse may be the same or may differ. When the wavelengths $\lambda 1$ and $\lambda 3$ are the same, an optical signal regenerative repeater having the same input and output waveforms can be provided.

At the first NOLM (SLALOM) optical gate, the wavelength band-pass filter 12a may be located between the nonlinear phase shifter 11a and the optical delay circuit 10a, or between the optical delay circuit 10a and the optical coupler 16a. Similarly, at the second NOLM (SLALOM) optical gate, the wavelength band-pass filter 12b may be located between the nonlinear phase shifter 11b and the optical delay circuit 10b, or between the optical delay circuit 10b and the optical coupler 16b.

Example 4

Figure 22:
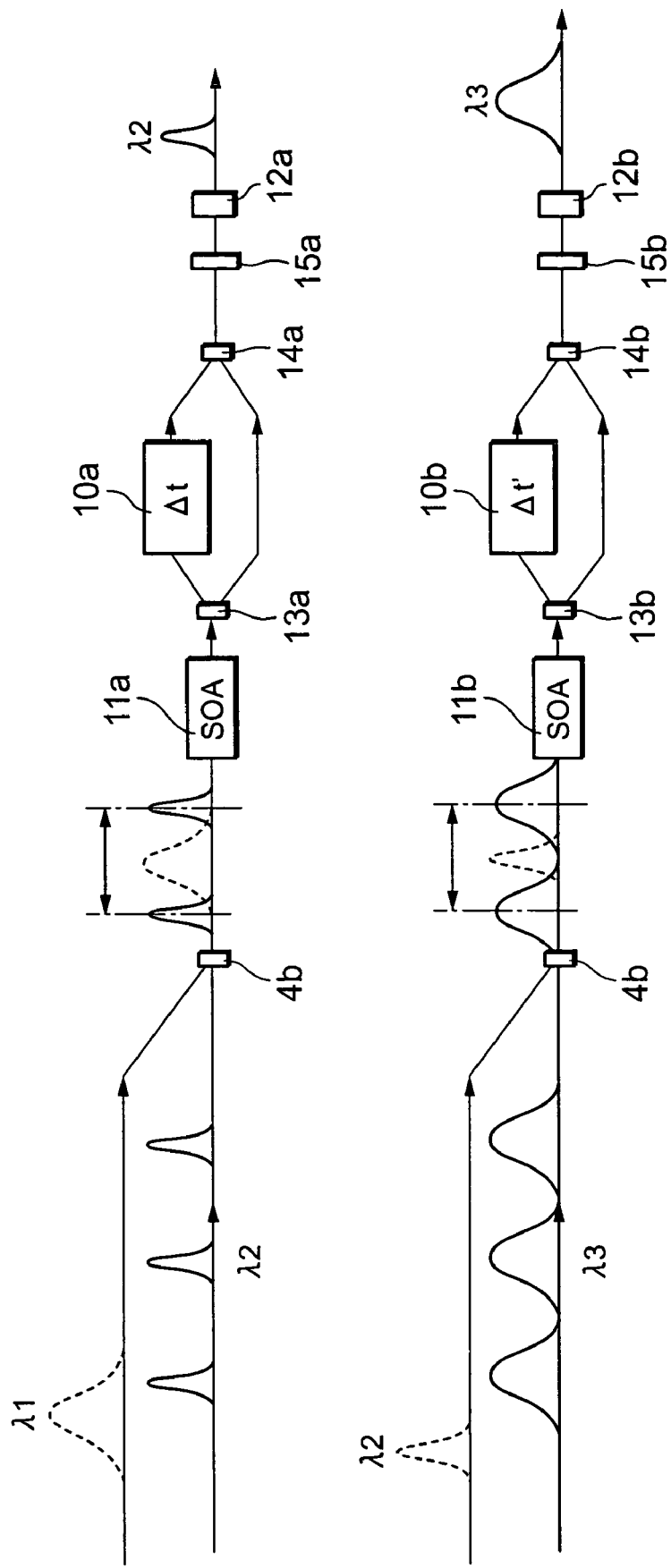
FIG. 22 is a block diagram showing a configuration according to a fourth example of the present invention.

FIG. 22 shows an optical signal regenerative repeater according to a fourth example of the present invention wherein two 3R repeaters that employ DISC optical gates are connected.

In this example, an optical communication signal pulse (wavelength $\lambda 1$) having a large pulse time width is supplied to a first DISC optical gate and a first clock extraction unit (not shown) that constitute an optical 3R repeater at the first stage. The first extraction unit extracts a clock from the received optical communication signal pulse (wavelength $\lambda 1$), and generates a optical clock pulse (wavelength $\lambda 2$) that is synchronized with the extracted clock and has a small pulse time width. This optical clock pulse is supplied as controlled light to the first DISC optical gate.

At the first DISC optical gate, the above described optical communication signal pulse, which is received as control light, is supplied through an optical coupler 4a to a nonlinear phase shifter 11a that is a semiconductor optical amplifier (SOA). The optical clock pulse output by the first clock extraction unit is supplied through the optical coupler 4a to the nonlinear phase shifter 11a.

The optical communication signal pulse is inserted between the first and second optical clock pulses that sequentially form the optical clock pulse. The time the optical communication signal pulse arrives at the nonlinear phase shifter 11a is later than the time the first optical clock pulse arrives at the nonlinear phase shifter 11a, and is earlier than the time whereat the second optical clock pulse arrives at the nonlinear phase shifter 11a. According to these arrival times, the first DISC optical gate is operated in a state wherein, along the time axis, the optical communication signal pulse that is control light is sandwiched between the first and the second optical clock pulses that are controlled light.

Since the first optical clock pulse arrives at the nonlinear phase shifter 11a before the optical communication signal pulse, the first optical clock pulse passes through without being affected by the nonlinear phase shift. Since the second optical clock pulse arrives at the nonlinear phase shifter 11a after the optical communication signal pulse, the second optical clock pulse is affected by the nonlinear phase shift due to the optical communication signal. The first and the second optical clock pulses, which pass through the nonlinear phase shifter 11a, are divided by an optical polarization separator 13a into first and second polarized component pulses for which the polarization axes orthogonally intersect each other. The second polarized component pulse is delayed by an optical delay circuit 10a for a relative delay time $\Delta t$ (equaling a bit period), and is then coupled with the first polarized component pulse by an optical polarization coupler 14a. The thus coupled first and second polarized component pulses interfere with each other and are synthesized, and an arbitrary linear polarized component is selected by a polarizer 15a. The pulse of the selected linear polarized component passes through a wavelength band-pass filter (BPF) 12a, and is output as intermediate signal light (wavelength $\lambda 2$) by the optical 3R repeater at the first stage.

The intermediate signal light is supplied by the optical 3R repeater at the first stage to a second DISC optical gate and a second clock extraction unit (not shown) that constitute an optical 3R repeater at the second stage. The second clock extraction unit extracts a clock from the intermediate signal light (wavelength $\lambda 2$) received from the optical 3R repeater at the first stage, and generates a optical clock pulse (wavelength $\lambda 3$) that is synchronized with the extracted clock and has a large pulse time width. This optical clock pulse is transmitted as controlled light to the second DISC optical gate.

The intermediate signal light, which is received by the second DISC optical gate from the first optical 3R repeater at the first stage, is transmitted through an optical coupler 4b to a nonlinear phase shifter 11b that is a semiconductor optical amplifier (SOA). At the same time, the optical clock pulse, which is received as controlled light from the second clock extraction unit, is supplied through the optical coupler 4b to the nonlinear phase shifter 11b.

The intermediate signal light is inserted between the sequential first and second optical clock pulses that form the optical clock pulse. The time the intermediate signal light arrives at the nonlinear phase shifter 11b is later than the time the first optical clock pulse arrives at the nonlinear phase shifter 11b, and is earlier than the time whereat the second optical clock pulse arrives at the nonlinear phase shifter 11b. According to these arrival times, the second DISC optical gate is operated in a state wherein, along the time axis, the intermediate signal light that is control light is sandwiched between the first and the second optical clock pulses that are controlled lights.

Since the first optical clock-pulse arrives at the nonlinear phase shifter 11b before the intermediate signal light, the first optical clock pulse passes through without being affected by the nonlinear phase shift. Since the second optical clock pulse arrives at the nonlinear phase shifter 11b after the intermediate signal light, the second optical clock pulse is affected by the nonlinear phase shift due to the intermediate signal light. The first and the second optical clock pulses, which pass through the nonlinear phase shifter 11b, are divided by an optical polarization separator 13b into first and second polarized component pulses for which the polarization axes orthogonally intersect each other. The second polarized component pulse is delayed by an optical delay circuit 10b for a relative delay time $\Delta t'$ (equaling a bit period), and is coupled with the first polarized component pulse by an optical polarization coupler 14b. The thus coupled first and second polarized component pulses interfere each other and are synthesized, and an arbitrary linear polarized component is selected by a polarizer 15b. The pulse of the selected linear polarized component passes through a wavelength band-pass filter (BPF) 12b, and is output externally as a regenerated communication signal pulse (wavelength $\lambda$ 3) by the optical signal regenerative repeater of this embodiment.

When the optical signal regenerative repeater of this embodiment is employed for the DWDM, high-capacity transmissions for which the time width of the optical communication signal pulse is about half the bit period at the Fourier transform limit, the pulse time width of a optical clock pulse that is generated by the first extraction unit is set considerably smaller than the bit period and the gate width ($\Delta t$), and the pulse time width of a optical clock pulse that is generated by the second clock extraction unit is set equal to that of the optical communication signal pulse.

The wavelength $\lambda$ 3 of the regenerated signal pulse and the wavelength $\lambda$ 1 of the optical communication signal pulse may be the same or may differ. When the wavelengths $\lambda$ 1 and $\lambda$ 3 are the same, an optical signal regenerative repeater having the same input and output wavelengths can be provided.

In the first DISC optical gate, the wavelength band-pass filter 12a may be located immediately after the nonlinear phase shifter 11a or immediately before the polarizer 15a. The polarization separator 13a, the optical delay circuit 10a and the polarization coupler 14a may be integrally formed as a single unit by using a birefringent crystal or fiber.

In the second DISC optical gate, the wavelength band-pass filter 12b may be located immediately after the nonlinear phase shifter 11b or immediately before the polarizer 15b. The polarization separator 13b, the optical delay circuit 10b and the polarization coupler 14b may be integrally formed as a single unit by using a birefringent crystal or fiber.

Example 5

Figure 23:
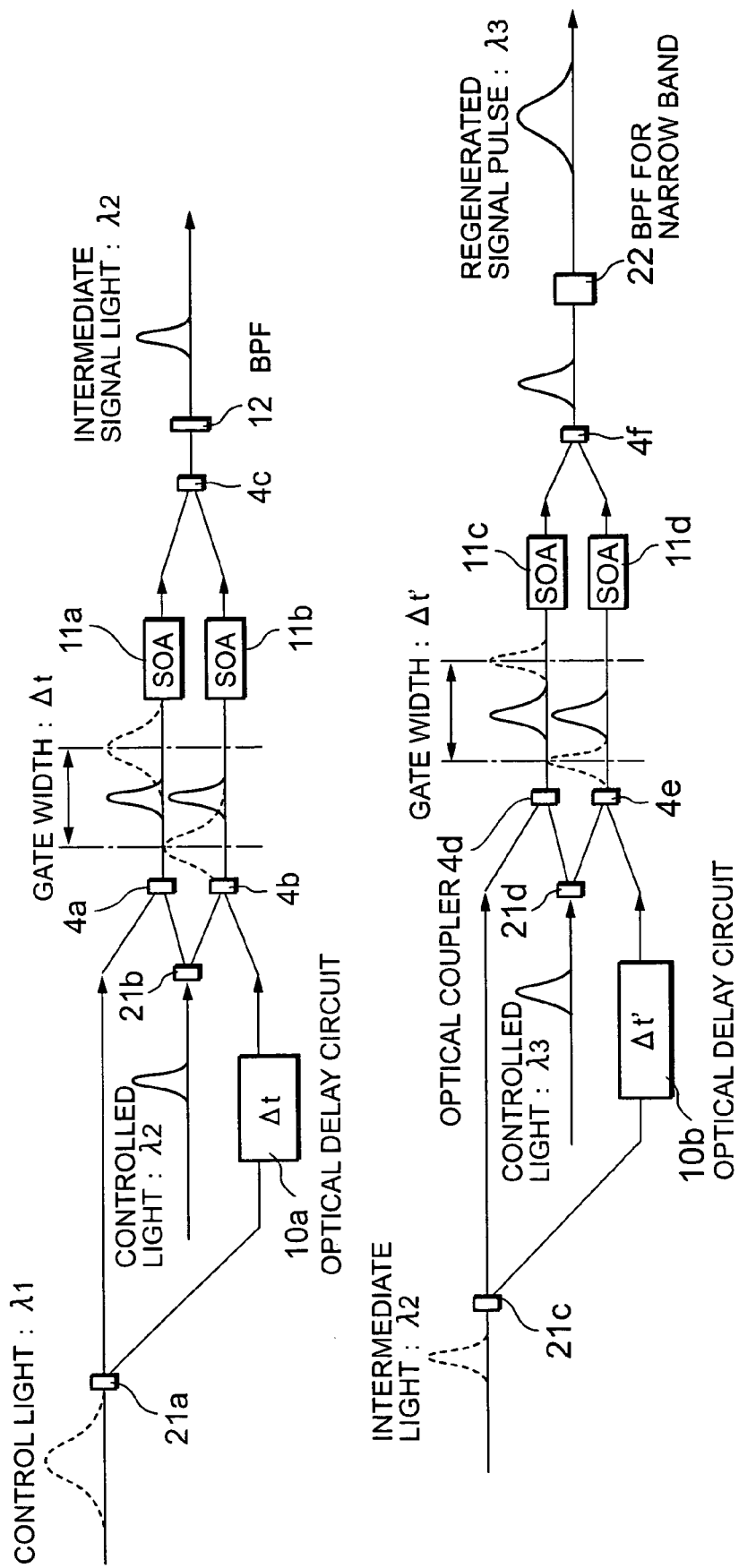
FIG. 23 is a block diagram showing a configuration according to a fifth example of the present invention.

FIG. 23 shows an optical regenerative repeater according to a fifth example of the present invention. In this example, the optical signal regenerative repeater sets a small time width for the optical clock pulse generated by the second clock extraction unit, which constitutes the optical 3R repeater at the second stage in the optical signal regenerative repeater shown in FIG. 19, and also employs a wavelength band-pass filter for a narrow band 22, instead of the wavelength band-pass filter 12b. The other sections are the same as those for the optical signal regenerative repeater shown in FIG. 19.

The basic operation of the optical signal regenerative repeater in this example is the same as the operation of the optical signal regenerative repeater in FIG. 19, except that a second clock extraction unit generates a optical clock pulse (wavelength $\lambda$ 3) having a small pulse time width.

A second SMZ optical gate receives intermediate signal light as control light from an optical 3R repeater at the first stage, and also receives, as controlled light from the second clock extraction unit, a optical clock pulse having a small pulse time width. Therefore, an optical coupler 4f outputs an optical pulse having a small pulse time width. The optical pulse output by the optical coupler 4f passes through a wavelength band-pass filter 22 for a narrow band, and is converted into an optical pulse having a pulse time width appropriate for optical communication. The resultant optical pulse, which has passed through the wavelength band-pass filter 22, is externally output as a regenerated optical communication signal pulse (wavelength $\lambda$ 3) by the optical signal regenerative repeater.

According to this example, the tolerance (timing jitter tolerance) for the timings whereat the control light and the controlled light arrive at the optical 3R repeater at the second stage can be further increased.

Example 6

FIG. 24 shows an optical signal regenerative repeater according to a sixth example of the present invention. For the optical signal regenerative repeater of this example, the optical 3R repeater at the second stage in the optical signal regenerative repeater in FIG. 19 is replaced by a DISC optical gate.

The operation of an optical 3R repeater at the first stage is the same as that shown in FIG. 19. The intermediate signal light is output by the optical 3R repeater at the first stage, and is supplied as control light to the DISC optical gate, continuous light (wavelength $\lambda$ 3) is supplied as controlled light to the DISC optical gate.

At the DISC optical gate, the intermediate signal light is supplied by the optical 3R repeater at the first stage through an optical coupler 4d to a nonlinear phase shifter 11c that is a semiconductor optical amplifier (SOA). The continuous light received as the controlled light is transmitted through the optical coupler 4d to the nonlinear phase shifter 11c.

The intermediate signal light is inserted into the continuous light at an arbitrary timing. Of the continuous light, the first portion that arrives at the nonlinear phase shifter 11c, before the intermediate signal light, passes through without being affected by the nonlinear phase shift, while the second portion that arrives, after the intermediate signal light, is affected by the nonlinear phase shift due to the intermediate signal light. The continuous light that passes through the nonlinear phase shift 11c is divided by an optical polarization separator 13 into first and second polarized components, for which the polarization axes orthogonally intersect each other. The first polarized component is delayed by an optical delay circuit 10b for a relative time delay Δ t', and is coupled with the second polarized component by an optical polarization coupler 14. The thus coupled first and second polarized components interfere with each other and are synthesized, and an arbitrary linear polarized component is selected by a polarizer 15. The pulse of the selected linear polarized component (the pulse time width is substantially determined by the time delay Δ t', which is provided by the optical delay circuit 10b) is converted into a pulse time width appropriate for optical communication by a wavelength band-pass filter (BPF) 22 for a narrow band. Then, the resultant pulse is output externally as a regenerated optical communication signal pulse (wavelength λ 3) by the optical signal regenerative repeater of this example.

When the optical signal regenerative repeater of this embodiment is employed for the DWDM, high-capacity transmissions for which the time width of the optical communication signal pulse is about half the bit period at the Fourier transform limit, the pulse time width of a optical clock pulse that is generated by the clock extraction unit of the optical 3R repeater at the first stage is set considerably smaller than the bit period and the gate width (Δ t). On the other hand, the pulse width of the regenerated optical communication signal pulse is set equal to that of the optical communication signal pulse.

In addition, the wavelength λ 3 of the regenerated optical communication signal pulse and the wavelength λ 1 of the optical communication signal pulse may be the same or may differ. When the wavelengths λ 1 and λ 3 are the same, an optical signal regenerative repeater having the same input and output wavelengths can be provided.

Furthermore, the polarization separator 13, the optical delay circuit 10b and the polarization coupler 14 may be integrally formed as a single unit by using a birefringent crystal or fiber.

Besides the combinations of the optical gates employed for the embodiments described above, an arbitrary combination for optical gates may also be employed.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. An optical signal regenerative repeater comprising:
    a first optical 3R repeater which receives an optical communication signal pulse, and regenerates said optical communication signal pulse,
    wherein said first optical 3R repeater comprises:
        a first clock extraction unit which extracts a clock from said optical communication signal pulse and which generates a first optical clock pulse synchronized with said extracted first clock, and
        a first optical gate, which is opened and closed in accordance with a first control light corresponding to said optical communication signal pulse, which receives as a first controlled light said first optical clock pulse generated by said first clock extraction unit, and which generates a first regenerated signal pulse corresponding to said optical communication signal pulse,
    wherein a pulse time width of said first control light is different from a pulse time width of said first controlled light, and
    wherein said optical signal regenerative repeater further comprises:
        a second optical 3R repeater which receives said first regenerated signal pulse output by said first optical 3R repeater as an intermediate signal light, and regenerates said optical communication signal pulse based on said intermediate signal light;
        wherein a pulse time width of said intermediate signal light is smaller than a pulse time width of said optical communication signal pulse; and
    wherein said second optical 3R repeater comprises:
        a second clock extraction unit, which extracts a second clock from said intermediate signal light and generates a second optical clock pulse synchronized with said extracted second clock and having an arbitrary pulse time width for optical communication; and
        a second optical gate, which is opened and closed in accordance with a second control light corresponding to said intermediate signal light, which receives as a second controlled light said second optical clock pulse generated by said second clock extraction unit, and which generates a second regenerated signal pulse corresponding to said optical communication signal pulse.

2. The optical signal regenerative repeater according to claim 1, wherein said pulse time width of said second control light is smaller than said pulse time width of said second controlled light.

3. The optical signal regenerative repeater according to claim 1,
    wherein said arbitrary pulse time width for optical communication of said second optical clock pulse and a pulse time width of said optical communication signal pulse input to said first optical 3R repeater are substantially the same.

4. An optical signal regenerative repeater according to claim 1,
    further comprising a pulse width converter which converts said pulse time width of said second regenerated signal pulse into said arbitrary pulse time width for optical communication,
    wherein said arbitrary pulse time width for optical communication of said second optical clock pulse and said pulse time width of said intermediate signal light are substantially the same.

5. The optical signal regenerative repeater according to claim 4,
    wherein said pulse time width of said second regenerated signal pulse converted by said pulse width converter and said pulse time width of said optical communication signal pulse are substantially the same.

6. The optical signal regenerative repeater according to claim 1, wherein a pulse time width of said second control light is different from a pulse time width of said second controlled light.

7. An optical signal regenerative repeater comprising:
    a first optical 3R repeater which receives an optical communication signal pulse, and regenerates said optical communication signal pulse, wherein said first optical 3R repeater comprises:
a first clock extraction unit which extracts a first clock from said optical communication signal pulse and which generates a first optical clock pulse synchronized with said extracted first clock, and
a first optical gate, which is opened and closed in accordance with a first control light corresponding to said optical communication signal pulse, which receives as a first controlled light said first optical clock pulse generated by said first clock extraction unit, and which generates a first regenerated signal pulse corresponding to said optical communication signal pulse,
wherein a pulse time width of said first control light is different from a pulse time width of said first controlled light, and
wherein said optical signal regenerative repeater further comprises:
a second optical 3R repeater which receives said first regenerated signal pulse output by said first optical 3R repeater as an intermediate signal light, and regenerates said optical communication signal pulse based on said intermediate signal light;
wherein a pulse time width of said intermediate signal light is smaller than a pulse time width of said optical communication signal pulse; and
wherein said second optical 3R repeater comprises:
a second clock extraction unit, which extracts a second clock from said first optical clock pulse generated by said first clock extraction unit, and which generates a second optical clock pulse synchronized with said extracted second clock; and
a second optical gate, which is opened and closed in accordance with a second control light corresponding to said intermediate signal light, which receives as a second controlled light said second optical clock pulse generated by said second clock extraction unit, and which generates a second regenerated signal pulse corresponding to said optical communication signal pulse.

8. The optical signal regenerative repeater according to claim 7,
wherein said pulse time width of said second controlled light supplied to said second optical gate is substantially the same as said pulse time width of said optical communication signal pulse.

9. An optical signal regenerative repeater comprising:
a first optical 3R repeater which receives an optical communication signal pulse, and regenerates said optical communication signal pulse,
wherein said first optical 3R repeater comprises:
a first clock extraction unit which extracts a first clock from said optical communication signal pulse and which generates a first optical clock pulse synchronized with said extracted first clock, and
a first optical gate, which is opened and closed in accordance with a first control light corresponding to said optical communication signal pulse, which receives as a first controlled light said first optical clock pulse generated by said first clock extraction unit, and which generates a first regenerated signal pulse corresponding to said optical communication signal pulse,
wherein a pulse time width of said first control light is different from a pulse time width of said first controlled light, and
wherein said optical signal regenerative repeater further comprises:
a second optical 3R repeater which receives said first regenerated signal pulse output by said first optical 3R repeater as an intermediate signal light, and regenerates said optical communication signal pulse based on said intermediate signal light;
wherein a pulse time width of said intermediate signal light is smaller than a pulse time width of said optical communication signal pulse; and
wherein said second optical 3R repeater comprises:
a pulse width converter which converts said first optical clock pulse generated by said first clock extraction unit into an arbitrary pulse time width for optical communication; and
a second optical gate, which is opened and closed in accordance with a second control light corresponding to said intermediate signal light, which receives as a second controlled light said first optical clock pulse converted by said pulse width converter, and which generates a second regenerated signal pulse corresponding to said optical communication signal pulse according to said second controlled light received by said second optical gate.

10. The optical signal regenerative repeater according to claim 9,
wherein said pulse time width of said second controlled light received by said second optical gate is substantially the same as said pulse time width of said optical communication signal pulse.

11. The optical signal regenerative repeater according to claim 9, further comprising:
a wavelength converter which converts into an arbitrary wavelength a wavelength of said first optical clock pulse generated by said first clock extraction unit.

12. An optical signal regenerative repeater comprising:
a first optical 3R repeater which receives an optical communication signal pulse, and regenerates said optical communication signal pulse,
wherein said first optical 3R repeater comprises:
a first clock extraction unit which extracts a first clock from said optical communication signal pulse and which generates a first optical clock pulse synchronized with said extracted first clock, and
a first optical gate, which is opened and closed in accordance with a first control light corresponding to said optical communication signal pulse, which receives as a first controlled light said first optical clock pulse generated by said first clock extraction unit, and which generates a first regenerated signal pulse corresponding to said optical communication signal pulse,
wherein a pulse time width of said first control light is different from a pulse time width of said first controlled light, and
wherein said optical signal regenerative repeater further comprises:
a second optical 3R repeater which receives said first regenerated signal pulse output by said first optical 3R repeater as an intermediate signal light, and regenerates said optical communication signal pulse based on said intermediate signal light;
wherein a pulse time width of said intermediate signal light is smaller than a pulse time width of said optical communication signal pulse; and wherein said second optical 3R repeater comprises:
a second optical gate, which is opened and closed in accordance with a second control light corresponding to said intermediate signal light, which receives as a second controlled light said first optical clock pulse generated by said first clock extraction unit, and which generates a second regenerated signal pulse corresponding to said optical communication signal pulse according to said second controlled light received by said second optical gate; and
a pulse width converter, which converts into an arbitrary pulse time width for optical communication a pulse time width of said second regenerated signal pulse generated by said second optical gate.

13. The optical signal regenerative repeater according to claim 12, further comprising:
a wavelength converter, which converts into an arbitrary wavelength a wavelength of said first optical clock pulse generated by said first clock extraction unit.

14. An optical signal regeneration method comprising:
receiving an optical communication signal pulse;
extracting a clock from said optical communication signal pulse and generating a first optical clock pulse synchronized with said extracted clock;
supplying said optical communication signal pulse as a control light to a first optical gate to open or close said first optical gate;
supplying said first optical clock pulse as a controlled light to said first optical gate; and
employing said controlled light to obtain a first regenerated signal pulse corresponding to said optical communication signal pulse according to opening or closing of said first optical gate,
wherein a pulse time width of said control light and said controlled light is different, and
wherein the optical signal regeneration method further comprises:
extracting a clock from said first regenerated signal pulse and generating a second optical clock pulse synchronized with said extracted clock from said first regenerated signal and having an arbitrary pulse time width for optical communication;
supplying said first regenerated signal as a control light to a second optical gate to open or close said second optical gate; and
supplying said second optical clock pulse generated as a controlled light to said second optical gate; and
employing said controlled light supplied to said second optical gate to obtain a second regenerated signal pulse corresponding to said optical communication signal pulse according to opening or closing said second optical gate based on said first generated optical signal pulse.

15. The optical signal regeneration method according to claim 14, further comprising:
converting into an arbitrary pulse time width for optical communication a pulse time width of said second regenerated signal pulse.

16. The optical signal regeneration method according to claim 14, further comprising:
extracting a clock from said first clock optical signal pulse and generating a second optical clock pulse synchronized with said extracted clock and having an arbitrary pulse time width for optical communication;
supplying said first regenerated signal pulse as a control light to a second optical gate for opening or closing said second optical gate;
supplying said second optical clock pulse as a controlled light to said second optical gate; and
employing said controlled signal supplied to said second optical gate to obtain a second regenerated signal pulse corresponding to said optical communication signal pulse according to opening or closing of said second optical gate based on said first regenerated signal pulse.

17. The optical signal regeneration method according to claim 14, further comprising:
converting, into an arbitrary pulse time width for optical communication, a pulse time width of said first optical clock pulse;
supplying said first regenerated signal pulse as a control light to a second optical gate for opening or closing said second optical gate;
supplying said first optical clock pulse, for which said pulse time width is changed, as a controlled light to said second optical gate; and
employing said controlled light supplied to said second optical gate to obtain a second regenerated signal pulse corresponding to said optical communication signal pulse received according to opening or closing of said second optical gate based on said first regenerated signal pulse.

18. The optical signal regeneration method according to claim 17, further comprising:
converting into an arbitrary wavelength a wavelength of said first optical clock pulse.

19. The optical signal regeneration method according to claim 14, further comprising:
supplying said first regenerated signal pulse as a control light to a second optical gate to open or close said second optical gate;
supplying said first optical clock pulse as a controlled light to said second optical gate;
employing said controlled light supplied to said second optical gate to obtain a second regenerated signal pulse corresponding to said optical communication signal pulse according to opening or closing of said second optical gate based on said first regenerated signal pulse; and
converting into an arbitrary pulse time width for optical communication a pulse time width of said second regenerated signal pulse.

20. The optical signal regeneration method according to claim 19, further comprising:
converting into an arbitrary wavelength a wavelength of said first optical clock pulse.

* * * * *